United States Patent
Agiwal et al.

(10) Patent No.: US 12,193,073 B2
(45) Date of Patent: Jan. 7, 2025

(54) METHOD AND APPARATUS FOR SMALL DATA TRANSMISSION IN A WIRELESS COMMUNICATION SYSTEM

(71) Applicant: Samsung Electronics Co., Ltd., Suwon-si (KR)

(72) Inventors: Anil Agiwal, Suwon-si (KR); Hyunjeong Kang, Suwon-si (KR); Sangbum Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 208 days.

(21) Appl. No.: 17/808,284

(22) Filed: Jun. 22, 2022

(65) Prior Publication Data
US 2022/0408495 A1    Dec. 22, 2022

(30) Foreign Application Priority Data
Jun. 22, 2021 (KR) .................. 10-2021-0081029

(51) Int. Cl.
| | |
|---|---|
| *H04W 76/20* | (2018.01) |
| *H04W 24/10* | (2009.01) |
| *H04W 56/00* | (2009.01) |
| *H04W 72/0446* | (2023.01) |
| *H04W 74/08* | (2009.01) |
| *H04W 74/0833* | (2024.01) |

(52) U.S. Cl.
CPC ....... *H04W 74/0841* (2013.01); *H04W 24/10* (2013.01); *H04W 56/001* (2013.01); *H04W 72/0446* (2013.01); *H04W 74/0866* (2013.01); *H04W 76/20* (2018.02)

(58) Field of Classification Search
CPC .................... H04W 74/0841; H04W 76/20
USPC .......................................... 370/329
See application file for complete search history.

(56) References Cited

U.S. PATENT DOCUMENTS

| | | | |
|---|---|---|---|
| 11,109,212 B2 | 8/2021 | Agiwal et al. | |
| 2021/0127414 A1 | 4/2021 | Abdoli et al. | |
| 2021/0337625 A1* | 10/2021 | Tsai | H04W 76/19 |

FOREIGN PATENT DOCUMENTS

| | | |
|---|---|---|
| CN | 104105114 A | 10/2014 |
| WO | 2022212706 A1 | 10/2022 |

OTHER PUBLICATIONS

Catt, "Consideration on UP common aspects of SDT", 3GPP TSG-RAN WG2 Meeting #144, May 19-27, 2021, R2-2105280, 7 pages.
Qualcomm Inc., "Discussion on open issues of SDT", 3GPP TSG-RAN WG2 Meeting #114, May 19-27, 2021, R2-2105885, 9 pages.
(Continued)

*Primary Examiner* — Sibte H Bukhari

(57) ABSTRACT

The disclosure relates to a 5G or 6G communication system for supporting a higher data transmission rate. According to an embodiment, the method comprises initiating a small data transmission (SDT) procedure, in a radio resource control (RRC) inactive state, obtaining a report for a log connection failure or an SDT procedure failure, based on an expiry of an SDT timer, wherein the report for the log connection failure includes information indicating that the report is for SDT and in case that the UE enters an RRC connected state, and transmitting the report to a base station, based on a request for the report from the base station.

16 Claims, 11 Drawing Sheets

(56) References Cited

OTHER PUBLICATIONS

Intel Corporation, "Fallback and failure handling for SDT", 3GPP TSG RAN WG2 Meeting #113bis-e, Apr. 12-20, 2021, R2-2102842, 12 pages.
LG Electronics, "Remaining UP issues in SDT", 3GPP TSG-RAN2 #114, May 19-27, 2021, R2-2106311, 6 pages.
International Search Report and Written Opinion of the International Searching Authority dated Oct. 4, 2022 in connection with International Patent Application No. PCT/KR2022/008865, 9 pages.
Supplementary European Search Report dated Jul. 16, 2024, in connection with European Application No. 22828746.2, 8 pages.

\* cited by examiner

METHOD AND APPARATUS FOR SMALL DATA TRANSMISSION IN A WIRELESS COMMUNICATION SYSTEM

CROSS-REFERENCE TO RELATED APPLICATIONS

This application is based on and claims priority under 35 U.S.C. § 119 of a Korean patent application number 10-2021-0081029, filed on Jun. 22, 2021, in the Korean Intellectual Property Office, the disclosure of which is incorporated by reference herein in its entirety.

BACKGROUND

1. Field

The present application relates generally to wireless communication systems, more specifically, the present disclosure relates to performing a small data transmission procedure.

2. Description of the Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive Multiple-Input Multiple-Output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as an LDPC (Low Density Parity Check) code for large amounts of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

In one aspect, the UE operation for monitoring PWS notification needs to be enhanced considering the relay operation. In another aspect, there is no logging of report for small data transmission in RRC INACTIVE as a result network cannot optimize the small data transmission configuration.

In one embodiment, a method performed by a user equipment in a wireless communication system is provided. The method includes initiating a small data transmission (SDT) procedure, in a radio resource control (RRC) inactive state; obtaining a report for a log connection failure or an SDT procedure failure, based on an expiry of an SDT timer, wherein the report for the log connection failure includes information indicating that the report is for SDT; and in case that the UE enters an RRC connected state, transmitting the report to a base station, based on a request for the report from the base station.

In another embodiment, a user equipment in a wireless communication system is provided. The user equipment includes a transceiver; and a processor coupled with the transceiver and configured to: initiate a small data transmission (SDT) procedure, in a radio resource control (RRC) inactive state, obtain a report for a log connection failure or an SDT procedure failure, based on an expiry of an SDT timer, wherein the report for the log connection failure includes information indicating that the report is for SDT, and in case that the UE enters an RRC connected state, transmit the report to a base station, based on a request for the report from the base station.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
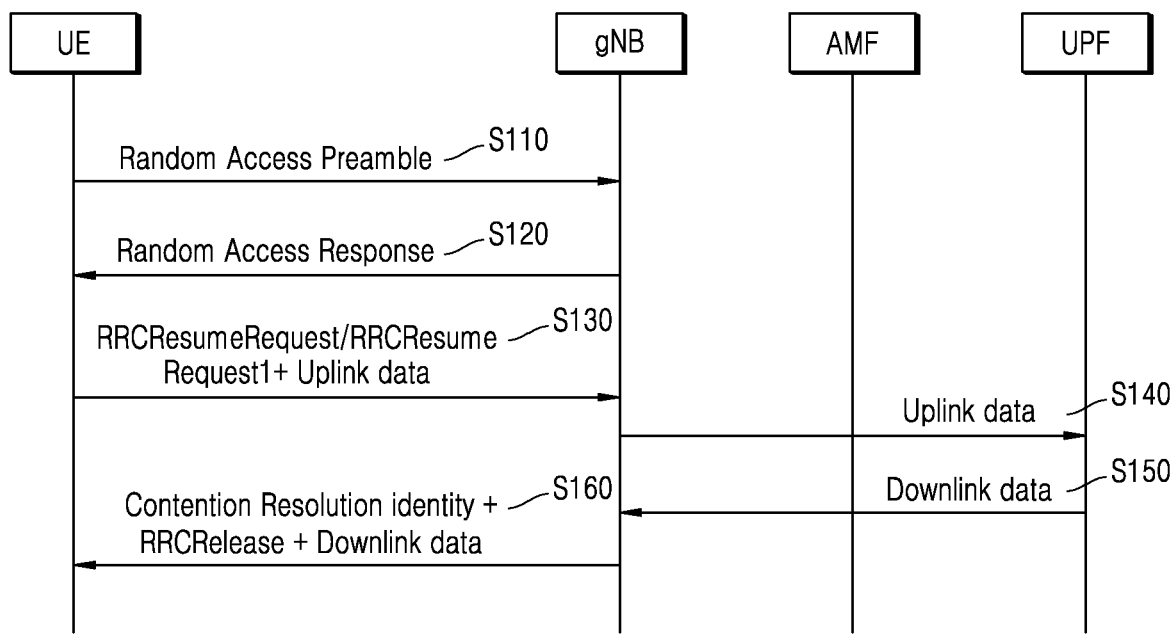
FIG. 1 illustrates an example of signaling flow for the small data transmission using 4 step RA according to an embodiment of the disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof. Throughout the specification, a layer (or a layer apparatus) may also be referred to as an entity. Hereinafter, operation principles of the disclosure will be described in detail with reference to accompanying drawings. In the following descriptions, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire descriptions of the present specification.

For the same reasons, in the drawings, some elements may be exaggerated, omitted, or roughly illustrated. Also, a size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements. It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s).

The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufactured items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables.

Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, in an embodiment of the disclosure, the "unit" may include at least one processor. In the following descriptions of the disclosure, well-known functions or configurations are not described in detail because they would obscure the disclosure with unnecessary details.

Hereinafter, for convenience of explanation, the disclosure uses terms and names defined in the 3rd generation partnership project long term evolution (3GPP LTE) standards. However, the disclosure is not limited to the terms and names, and may also be applied to systems following other standards.

In the disclosure, an evolved node B (eNB) may be interchangeably used with a next-generation node B (gNB) for convenience of explanation. That is, a base station (BS) described by an eNB may represent a gNB. In the following descriptions, the term "base station" refers to an entity for allocating resources to a user equipment (UE) and may be used interchangeably with at least one of a gNode B, an eNode B, a node B, a base station (BS), a radio access unit, a base station controller (BSC), or a node over a network. The term "terminal" may be used interchangeably with a user equipment (UE), a mobile station (MS), a cellular phone, a smartphone, a computer, or a multimedia system capable of performing communication functions. However, the disclosure is not limited to the aforementioned examples. In particular, the disclosure is applicable to 3GPP new radio (NR) (or 5th generation (5G)) mobile communication standards. In the following description, the term eNB may be interchangeably used with the term gNB for convenience of explanation. That is, a base station explained as an eNB may also indicate a gNB. The term UE may also indicate a mobile phone, NB-IoT devices, sensors, and other wireless communication devices.

FIG. 1 through FIG. 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In the recent years several broadband wireless technologies have been developed to meet the growing number of broadband subscribers and to provide more and better applications and services. The second generation wireless communication system has been developed to provide voice services while ensuring the mobility of users. The third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So the fifth generation wireless communication system (also referred as next generation radio or NR) is being developed to meet the growing demand for high speed data services, support ultra-reliability and low latency applications.

The fifth generation wireless communication system supports not only lower frequency bands but also higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of the fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. A few example use cases the fifth generation wireless communication system is expected to address are enhanced Mobile Broadband (eMBB), massive Machine Type Communication (m-MTC), ultra-reliable low latency communication (URLL) etc. The eMBB requirements like tens of Gbps data rate, low latency, high mobility, so on and so forth address the market segment representing the conventional wireless broadband subscribers needing internet connectivity everywhere, all the time and on the go. The m-MTC requirements like very high connection density, infrequent data transmission, very long battery life, low mobility address, so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enablers for autonomous cars.

CA/Multi-connectivity in fifth generation wireless communication system: The fifth generation wireless communication system supports standalone mode of operation as well as dual connectivity (DC). In DC a multiple Rx/Tx UE may be configured to utilize resources provided by two different nodes (or NBs) connected via non-ideal backhaul. One node acts as the Master Node (MN) and the other acts as the Secondary Node (SN). The MN and SN are connected via a network interface and at least the MN is connected to the core network. NR also supports Multi-RAT Dual Connectivity (MR-DC) operation whereby a UE in RRC_CONNECTED is configured to utilize radio resources provided by two distinct schedulers, located in two different nodes connected via a non-ideal backhaul and providing either E-UTRA (i.e., if the node is an ng-eNB) or NR access (i.e., if the node is a gNB). In NR for a UE in RRC_CONNECTED not configured with CA/DC there is only one serving cell comprising the primary cell. For a UE in RRC_CONNECTED configured with CA/DC the term 'serving cells' is used to denote the set of cells comprising the Special Cell(s) and all secondary cells. In NR the term Master Cell Group (MCG) refers to a group of serving cells associated with the Master Node, comprising the PCell and optionally one or more SCells. In NR the term Secondary Cell Group (SCG) refers to a group of serving cells associated with the Secondary Node, comprising the PSCell and optionally one or more SCells. In NR PCell (primary cell) refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. Primary SCG Cell (PSCell) refers to a serving cell in SCG in which the UE performs random access when performing the Reconfiguration with Sync procedure. For Dual Connectivity operation the term SpCell (i.e., Special Cell) refers to the PCell of the MCG or the PSCell of the SCG, otherwise the term Special Cell refers to the PCell.

PDCCH in fifth generation wireless communication system: In the fifth generation wireless communication system, Physical Downlink Control Channel (PDCCH) is used to schedule DL transmissions on PDSCH and UL transmissions on PUSCH, where the Downlink Control Information (DCI) on PDCCH includes: Downlink assignments containing at least modulation and coding format, resource allocation, and hybrid-ARQ information related to downlink shared channel (DL-SCH); Uplink scheduling grants containing at least modulation and coding format, resource allocation, and hybrid-ARQ information related to UL-SCH. In addition to scheduling, PDCCH can be used to for: Activation and deactivation of configured PUSCH transmission with configured grant;

Activation and deactivation of PDSCH semi-persistent transmission; Notifying one or more UEs of the slot format; Notifying one or more UEs of the PRB(s) and OFDM symbol(s) where the UE may assume no transmission is intended for the UE; Transmission of TPC commands for PUCCH and PUSCH; Transmission of one or more TPC commands for SRS transmissions by one or more UEs; Switching a UE's active bandwidth part; Initiating a random access procedure. A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own DMRS. QPSK modulation is used for PDCCH.

In the fifth generation wireless communication system, a list of search space configurations is signaled by the GNB for each configured BWP of the serving cell wherein each search configuration is uniquely identified by a search space identifier. The search space identifier is unique amongst the BWPs of a serving cell. The identifier of search space configuration to be used for specific purpose such as paging reception, SI reception, random access response reception is explicitly signaled by the gNB for each configured BWP. In NR, the search space configuration comprises parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the Equation 1 below:

$$(y*(\text{number of slots in a radio frame})+x-\text{Monitoring-offset-PDCCH-slot}) \bmod (\text{Monitoring-periodicity-PDCCH-slot})=0; \quad \text{Equation 1}$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. The search space configuration includes the identifier of coreset configuration associated with it. A list of coreset configurations are signaled by the GNB for each configured BWP of the serving cell wherein each coreset configuration is uniquely identified by a coreset identifier. The coreset identifier is unique amongst the BWPs of a serving cell. For example, each radio frame is of 10 ms duration. The radio frame is identified by a radio frame number or system frame number. Each radio frame comprises several slots wherein the number of slots in a radio frame and duration of slots depends on sub carrier spacing. The number of slots in the radio frame and the duration of slots depends on the radio frame for each supported SCS and is pre-defined in NR. Each coreset configuration is associated with a list of TCI (Transmission configuration indicator) states. One DL RS ID (SSB or CSI RS) is configured per TCI state. The list of TCI states corresponding to a coreset configuration is signaled by the gNB via RRC signaling. One of the TCI states in the TCI state list is activated and indicated to the UE by the gNB. The TCI state indicates the DL TX beam (DL TX beam is QCLed with SSB/CSI RS of TCI state) used by the GNB for transmission of PDCCH in the PDCCH monitoring occasions of a search space.

BWP operation in fifth generation wireless communication system: In the fifth generation wireless communication system bandwidth adaptation (BA) is supported. With BA, the receive and transmit bandwidth of a UE need not be as large as the bandwidth of the cell and can be adjusted: the width can be ordered to change (e.g., to shrink during period of low activity to save power); the location can move in the frequency domain (e.g., to increase scheduling flexibility); and the subcarrier spacing can be ordered to change (e.g., to allow different services). A subset of the total cell bandwidth of a cell is referred to as a Bandwidth Part (BWP). BA is achieved by configuring an RRC connected UE with BWP(s) and telling the UE which of the configured BWPs is currently the active one. When BA is configured, the UE only has to monitor PDCCH on the one active BWP i.e., it does not have to monitor PDCCH on the entire DL frequency of the serving cell. In the RRC connected state, the UE is configured with one or more DL and UL BWPs, for each configured Serving Cell (i.e., PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of Random Access procedure. Upon addition of an SpCell or activation of an SCell, the DL BWP and UL BWP indicated by firstActive-DownlinkBWP-Id and firstActiveUplinkBWP-Id respectively is active without receiving the PDCCH indicating a downlink assignment or an uplink grant. The active BWP for a Serving Cell is indicated by either the RRC or the PDCCH. For unpaired spectrum, a DL BWP is paired with a UL BWP, and BWP switching is common for both UL and DL. Upon expiry of the BWP inactivity timer the UE switches to the active DL BWP to the default DL BWP or initial DL BWP (if default DL BWP is not configured).

System information acquisition in fifth generation wireless communication system: In the fifth generation wireless communication system, the node B (gNB) or the base station in cell broadcast Synchronization Signal and PBCH block (SSB) consists of primary and secondary synchronization signals (PSS, SSS) and system information. System information includes common parameters needed to communicate in cell. In the fifth generation wireless communication system (also referred as next generation radio or NR), System Information (SI) is divided into the MIB and a number of SIBs where:

the MIB is always transmitted on the BCH with a periodicity of 80 ms and repetitions made within 80 ms and it includes parameters that are needed to acquire SIB1 from the cell.

the SIB1 is transmitted on the DL-SCH with a periodicity of 160 ms and variable transmission repetition. The default transmission repetition periodicity of SIB1 is 20 ms but the actual transmission repetition periodicity is up to network implementation. The scheduling information in SIB 1 includes mapping between SIBs and SI messages, periodicity of each SI message and SI window length. The scheduling information in SIB 1 includes information regarding an indicator for each SI message, which indicates whether the concerned SI message is being broadcasted or not. If at least one SI message is not being broadcasted, SIB1 may include random access resources (PRACH preamble(s) and PRACH resource(s)) for requesting the gNB to broadcast one or more SI message(s).

SIBs other than SIB1 are carried in System Information (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with an SI-window and the SI-windows of different SI messages do not overlap. That is, within one SI-window only the corresponding SI message is transmitted. Any SIB except SIB1 can be configured to be cell specific or area specific, using an indication in SIB 1. The cell specific SIB is applicable only within a cell that provides the SIB while the area specific SIB is applicable within an area referred to as SI area, which consists of one or several cells and is identified by systemInformationAreaID.

SI change indication and PWS notification in fifth generation wireless communication system: A modification period is used, i.e., updated SI message (other than SI message for ETWS, CMAS and positioning assistance data) is broadcasted in the modification period following the one where SI change indication is transmitted. The modification period boundaries are defined by SFN values for which SFN mod m=0, where m is the number of radio frames comprising the modification period. The modification period is configured by system information. The UE receives indications about SI modifications and/or PWS notifications using Short Message transmitted with P-RNTI over DCI. Repetitions of SI change indication may occur within preceding modification period.

UEs in RRC_IDLE or in RRC_INACTIVE shall monitor for SI change indication in its own paging occasion every DRX cycle. UEs in RRC_CONNECTED shall monitor for SI change indication in any paging occasion at least once per modification period if the UE is provided with common search space, including pagingSearchSpace, searchSpaceSIB1 and searchSpaceOtherSystemInformation, on the active BWP to monitor paging.

ETWS or CMAS capable UEs in RRC_IDLE or in RRC_INACTIVE shall monitor for indications about PWS notification in its own paging occasion every DRX cycle. ETWS or CMAS capable UEs in RRC_CONNECTED shall monitor for indication about PWS notification in any paging occasion at least once every defaultPagingCycle if the UE is provided with common search space, including pagingSearchSpace, searchSpaceSIB1 and searchSpaceOtherSystemInformation, on the active BWP to monitor paging.

In the 5G wireless communication system, random access (RA) is supported. Random access (RA) is used to achieve uplink (UL) time synchronization. RA is used during initial access, handover, radio resource control (RRC) connection re-establishment procedure, scheduling request transmission, secondary cell group (SCG) addition/modification, beam failure recovery and data or control information transmission in UL by non-synchronized UE in the RRC CONNECTED state. Several types of random access procedure are supported.

Contention based random access (CBRA): This is also referred as 4 step CBRA. In this type of random access, the UE first transmits Random Access preamble (also referred as Msg1) and then waits for Random access response (RAR) in the RAR window. The RAR is also referred to as Msg2. Next generation node B (gNB) transmits the RAR on the physical downlink shared channel (PDSCH). PDCCH scheduling the PDSCH carrying the RAR is addressed to RA-radio network temporary identifier (RA-RNTI). The RA-RNTI identifies the time-frequency resource (also referred as physical RA channel (PRACH) occasion or PRACH transmission (TX) occasion or RA channel (RACH) occasion) in which the RA preamble was detected by the gNB. The RA-RNTI is calculated as follows: RA-RNTI=$1+s\_id+14*t\_id+14*80*f\_id+14*80*8*ul\_carrier\_id$, where s_id is the index of the first orthogonal frequency division multiplexing (OFDM) symbol of the PRACH occasion where the UE has transmitted Msg1, i.e., RA preamble; $0 \le s\_id < 14$; t_id is the index of the first slot of the PRACH occasion ($0 \le t\_id < 80$); f_id is the index of the PRACH occasion within the slot in the frequency domain ($0 \le f\_id < 8$), and ul_carrier_id is the UL carrier used for Msg1 transmission (0 for normal UL (NUL) carrier and 1 for supplementary UL (SUL) carrier. Several RARs for various Random access preambles detected by the gNB can be multiplexed in the same RAR media access control (MAC) protocol data unit (PDU) by the gNB. An RAR in MAC PDU corresponds to the UE's RA preamble transmission if the RAR includes an RA preamble identifier (RAPID) of the RA preamble transmitted by the UE. If the RAR corresponding to its RA preamble transmission is not received during the RAR window and the UE has not yet transmitted the RA preamble for a configurable (configured by the gNB in RACH configuration) number of times, the UE goes back to the first step i.e., select random access resource (preamble/RACH occasion) and transmits the RA preamble. A backoff may be applied before going back to first step.

If the RAR corresponding to its RA preamble transmission is received the UE transmits message 3 (Msg3) in the UL grant received in the RAR. Msg3 includes a message such as RRC connection request, RRC connection re-establishment request, RRC handover confirm, scheduling request, SI request etc. It may include the UE identity (i.e., cell-radio network temporary identifier (C-RNTI) or system architecture evolution (SAE)-temporary mobile subscriber identity (S-TMSI) or a random number). After transmitting the Msg3, the UE starts a contention resolution timer. While the contention resolution timer is running, if the UE receives a physical downlink control channel (PDCCH) addressed to the C-RNTI included in Msg3, contention resolution is considered successful, the contention resolution timer is stopped and the RA procedure is completed. While the contention resolution timer is running, if the UE receives contention resolution MAC control element (CE) including the UE's contention resolution identity (first X bits of common control channel (CCCH) service data unit (SDU) transmitted in Msg3), contention resolution is considered successful, contention resolution timer is stopped and the RA procedure is completed. If the contention resolution timer expires and the UE has not yet transmitted the RA preamble for a configurable number of times, the UE goes back to the first step i.e., select random access resource (preamble/RACH occasion) and transmits the RA preamble. A backoff may be applied before going back to first step.

2 step contention based random access (2 step CBRA): In the first step, the UE transmits the random access preamble on the PRACH and a payload (i.e., MAC PDU) on the PUSCH. The random access preamble and payload transmission is also referred as MsgA. In the second step, after MsgA transmission, the UE monitors for a response from the network (i.e., gNB) within a configured window. The response is also referred as MsgB. Next generation node B (gNB) transmits the MsgB on the physical downlink shared channel (PDSCH). The PDCCH scheduling the PDSCH carrying MsgB is addressed to MsgB-radio network temporary identifier (MSGB-RNTI). The MSGB-RNTI identifies the time-frequency resource (also referred as physical RA channel (PRACH) occasion or PRACH transmission (TX) occasion or RA channel (RACH) occasion) in which the RA preamble was detected by the gNB. The MSGB-RNTI is calculated as follows: RA-RNTI=1+s_id+14*t_id+14*80*f_id+14*80*8*ul_carrier_id+14×80×8×2, where s_id is the index of the first orthogonal frequency division multiplexing (OFDM) symbol of the PRACH occasion where the UE has transmitted Msg1, i.e., RA preamble; 0≤s_id<14; t_id is the index of the first slot of the PRACH occasion (0≤t_id<80); fid is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier.

If CCCH SDU was transmitted in the MsgA payload, the UE performs contention resolution using the contention resolution information in MsgB. The contention resolution is successful if the contention resolution identity received in MsgB matches the first 48 bits of the CCCH SDU transmitted in MsgA. If the C-RNTI was transmitted in the MsgA payload, the contention resolution is successful if the UE receives the PDCCH addressed to the C-RNTI. If contention resolution is successful, the random access procedure is considered successfully completed. Instead of contention resolution information corresponding to the transmitted MsgA, MsgB may include a fallback information corresponding to the random access preamble transmitted in MsgA. If the fallback information is received, the UE transmits Msg3 and performs contention resolution using Msg4 as in the CBRA procedure. If contention resolution is successful, the random access procedure is considered successfully completed. If contention resolution fails upon fallback (i.e., upon transmitting Msg3), the UE retransmits MsgA. If the configured window in which the UE monitors the network response after transmitting MsgA expires and the UE has not received MsgB including contention resolution information or fallback information as explained above, the UE retransmits MsgA. If the random access procedure is not successfully completed even after transmitting the msgA configurable number of times, the UE falls back to the 4 step RACH procedure i.e., the UE only transmits the PRACH preamble.

The MsgA payload may include one or more of common control channel (CCCH) service data unit (SDU), dedicated control channel (DCCH) SDU, dedicated traffic channel (DTCH) SDU, buffer status report (BSR) MAC control element (CE), power headroom report (PHR) MAC CE, SSB information, C-RNTI MAC CE, or padding. MsgA may include UE ID (e.g., random ID, S-TMSI, C-RNTI, resume ID, etc.) along with a preamble in the first step. The UE ID may be included in the MAC PDU of the MsgA. UE ID such as C-RNTI may be carried in the MAC CE wherein the MAC CE is included in the MAC PDU. Other UE IDs (such as random ID, S-TMSI, C-RNTI, resume ID, etc.) may be carried in the CCCH SDU. The UE ID can be one of random ID, S-TMSI, C-RNTI, resume ID, IMSI, idle mode ID, inactive mode ID, etc. The UE ID can be different in different scenarios in which the UE performs the RA procedure. When the UE performs RA after power on (before it is attached to the network), then the UE ID is the random ID. When the UE performs RA in the IDLE state after it is attached to the network, the UE ID is S-TMSI. If the UE has an assigned C-RNTI (e.g., in the connected state), the UE ID is C-RNTI. In case the UE is in the INACTIVE state, the UE ID is resume ID. In addition to the UE ID, some addition ctrl information can be sent in MsgA. The control information may be included in the MAC PDU of the MsgA. The control information may include one or more of connection request indication, connection resume request indication, SI request indication, buffer status indication, beam information (e.g., one or more DL TX beam ID(s) or SSB ID(s)), beam failure recovery indication/information, data indicator, cell/BS/TRP switching indication, connection re-establishment indication, reconfiguration complete or handover complete message, etc.

Paging in fifth generation wireless communication system: The 5G or Next Generation Radio Access Network (NG-RAN) based on NR consists of NG-RAN nodes where the NG-RAN node is a gNB, providing NR user plane and control plane protocol terminations towards the UE. The gNBs are also connected by means of the NG interfaces to the 5GC, more specifically to the AMF (Access and Mobility Management Function) by means of the NG-C interface and to the UPF (User Plane Function) by means of the NG-U interface. In the 5th generation (also referred as NR or New Radio) wireless communication system, the UE may use Discontinuous Reception (DRX) in the RRC_IDLE and RRC_INACTIVE state in order to reduce power consumption. In the RRC_IDLE/RRC_INACTIVE state the UE wakes up at regular intervals (i.e., every DRX cycle) for short periods to receive paging, to receive SI update notification and to receive emergency notifications. The paging message is transmitted using the physical downlink shared channel (PDSCH). The physical downlink common control channel (PDCCH) is addressed to P-RNTI if there is a paging message in the PDSCH. The P-RNTI is common for all UEs. UE identity (i.e., S-TMSI for RRC_IDLE UE or I-RNTI for RRC_INACTIVE UE) is included in the paging message to indicate paging for a specific UE. The paging message may include multiple UE identities to page multiple UEs. The paging message is broadcasted (i.e., PDCCH is masked with P-RNTI) over data channel (i.e., PDSCH). SI update and emergency notifications are included in DCI and PDCCH carrying this DCI is addressed to P-RNTI. In the RRC idle/inactive mode the UE monitors one paging occasion (PO) every DRX cycle. In the RRC idle/inactive mode the UE monitors PO in initial DL BWP. In the RRC connected state the UE monitors one or more POs to receive SI update notification and to receive emergency notifications. The UE can monitor any PO in the paging DRX cycle and monitors at least one PO in the SI modification period.

In the RRC idle/inactive mode the UE monitors the PO in its active DL BWP. A PO is a set of 'S' PDCCH monitoring occasions for paging, where 'S' is the number of transmitted SSBs (i.e., the Synchronization Signal and PBCH block (SSB) consists of primary and secondary synchronization signals (PSS, SSS) and PBCH) in cell. The UE first determines the paging frame (PF) and then determines the PO with respect to the determined PF. One PF is a radio frame (10 ms).

The PF for a UE is the radio frame with system frame number SFN' which satisfies the equation (SFN+ PF_offset) mod T=(T div N)*(UE_ID mod N).

Index (i_s), indicating the index of the PO is determined by i_s=floor(UE_ID/N) mod Ns.

T is DRX cycle of the UE.

In the RRC_INACTIVE state, T is determined by the shortest of the UE specific DRX value configured by RRC, UE specific DRX value configured by NAS, and a default DRX value broadcast in system information.

In the RRC_IDLE state, T is determined by the shortest of UE specific DRX value configured by NAS, and a default DRX value broadcast in system information. If UE specific DRX is not configured by upper layers (i.e., NAS), the default value is applied.

N: number of total paging frames in T
Ns: number of paging occasions for a PF
PF_offset: offset used for PF determination
UE_ID: 5G-S-TMSI mod 1024

Parameters Ns, nAndPagingFrameOffset, and the length of default DRX Cycle are signaled in SIB1. The values of N and PF_offset are derived from the parameter nAndPagingFrameOffset as defined in TS 38.331. If the UE has no 5G-S-TMSI, for instance when the UE has not yet registered onto the network, the UE shall use as default identity UE_ID=0 in the PF and i_s formulas above.

The PDCCH monitoring occasions for paging are determined based on paging search space configuration (paging-SearchSpace) signaled by the gNB.

When SearchSpaceId=0 is configured for paging-SearchSpace, the PDCCH monitoring occasions for paging are the same as for RMSI as defined in clause 13 in TS 38.213. When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the (i_s+1)th PO. The PDCCH monitoring occasions for paging are determined based on paging search space configuration (paging-SearchSpace) signaled by the gNB. The PDCCH monitoring occasions for paging which are not overlapping with UL symbols (determined according to tdd-UL-DL-ConfigurationCommon) are sequentially numbered from zero starting from the 1st PDCCH monitoring occasion for paging in the PF. The gNB may signal parameter firstPDCCH-MonitoringOccasionOfPO for each PO corresponding to a PF. When firstPDCCH-MonitoringOccasionOfPO is signalled, the (i_s+1)th PO is a set of 'S' consecutive PDCCH monitoring occasions for paging starting from the PDCCH monitoring occasion number indicated by firstPDCCH-MonitoringOccasionOfPO (i.e., the (i_s+ 1)th value of the firstPDCCH-MonitoringOccasion-OfPO parameter). Otherwise, the (i_s+1)th PO is a set of 'S' consecutive PDCCH monitoring occasions for paging starting from the (i_s*S)th PDCCH monitoring occasion for paging. 'S' is the number of actual transmitted SSBs determined according to parameter ssb-PositionsInBurst signalled in SystemInformationBlock1 received from the gNB. The parameter firstPDCCH-MonitoringOccasionOfPO is signalled in SIB1 for paging in initial DL BWP. For paging in a DL BWP other than the initial DL BWP, the parameter first-PDCCH-MonitoringOccasionOfPO is signaled in the corresponding BWP configuration.

The PDCCH addressed to P-RNTI carries information according to DCI format 1_0. The following information is transmitted by means of the DCI format 1_0 with CRC scrambled by P-RNTI:

Short Messages Indicator—2 bits according to Table 1.

Short Messages—8 bits according to Table 2. If only the scheduling information for Paging is carried, this bit field is reserved.

Frequency domain resource assignment—$\lceil \log_2(N_{RB}^{DL,BWP}(N_{RB}^{DL,BWP}+1)/2) \rceil$ bits. If only the short message is carried, this bit field is reserved. $N_{RB}^{DL,BWP}$ is the size of CORESET 0

Time domain resource assignment—4 bits. If only the short message is carried, this bit field is reserved.

VRB-to-PRB mapping—1 bit. If only the short message is carried, this bit field is reserved.

Modulation and coding scheme—5 bits. If only the short message is carried, this bit field is reserved.

TB scaling—2 bits. If only the short message is carried, this bit field is reserved.

Reserved bits—6 bits

TABLE 1

Short Message indicator

| Bit field | Short Message indicator |
|---|---|
| 00 | Reserved |
| 01 | Only scheduling information for Paging is present in the DCI |
| 10 | Only short message is present in the DCI |
| 11 | Both scheduling information for Paging and short message are present in the DCI |

Table 2 defines Short Message. Bit 1 is the most significant bit.

TABLE 2

Short Message

| Bit | Short Message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3-8 | Reserved |

Small data transmission in fifth generation wireless communication system: In the 5G wireless communication system, a small data transmission (SDT) in the RRC_INACTIVE is supported. The uplink data can be transmitted in Msg3 in case of 4 step RA procedure and in MsgA in case of 2 step RA procedure. FIG. 1 illustrates an example of signaling flow for the small data transmission using 4 step RA according to an embodiment of the disclosure.

In case that a criteria to initiate 4 step RA for SDT is met, the UE selects preamble/RO from preambles/ROs for SDT. The UE transmits random access preamble (S110) and receives RAR including a UL grant for Msg3 transmission (S120).

The UE sends an RRCResumeRequest/RRCResumeRequest1 to the gNB (same as the last serving GNB) on SRB 0 (S130). It includes full/short I-RNTI (resumeIdentity), the resume cause (resumeCause), and an authentication token (resumeMAC-I). The I-RNTI (short or full I-RNTI) is used for context identification and its value shall be the same as the I-RNTI that the UE had received from the last serving gNB in the RRCRelease with suspendConfig message.

The UE resumes SRB(s) and DRB(s), derives new security keys using the NextHopChainingCount provided in the RRCRelease message of the previous RRC connection and re-establishes the AS security. The user data are ciphered and integrity protected (only for DRBs configured with UP integrity protection) and transmitted on DTCH multiplexed with the RRCResumeRequest/RRCResumeRequest1 message on CCCH/CCCH1.

The gNB validates the resumeMAC-I and delivers the uplink data to the UPF (S140).

The gNB sends the RRCRelease message to keep the UE in RRC_INACTIVE. The PDCCH is addressed to TC-RNTI. If downlink data is available (S150), they are sent ciphered and integrity protected (only for DRBs configured with UP integrity protection) on DTCH multiplexed with the RRCRelease message on DCCH (S160). The gNB may decide not to send the RRCRelease message together with contention Resolution Identity. In this case upon completion of random access, the UE monitors the PDCCH addressed to C-RNTI. UL/DL data can be exchanged between the UE and the gNB until the RRCRelease message is received or the SDT procedure is terminated.

Figure 2:
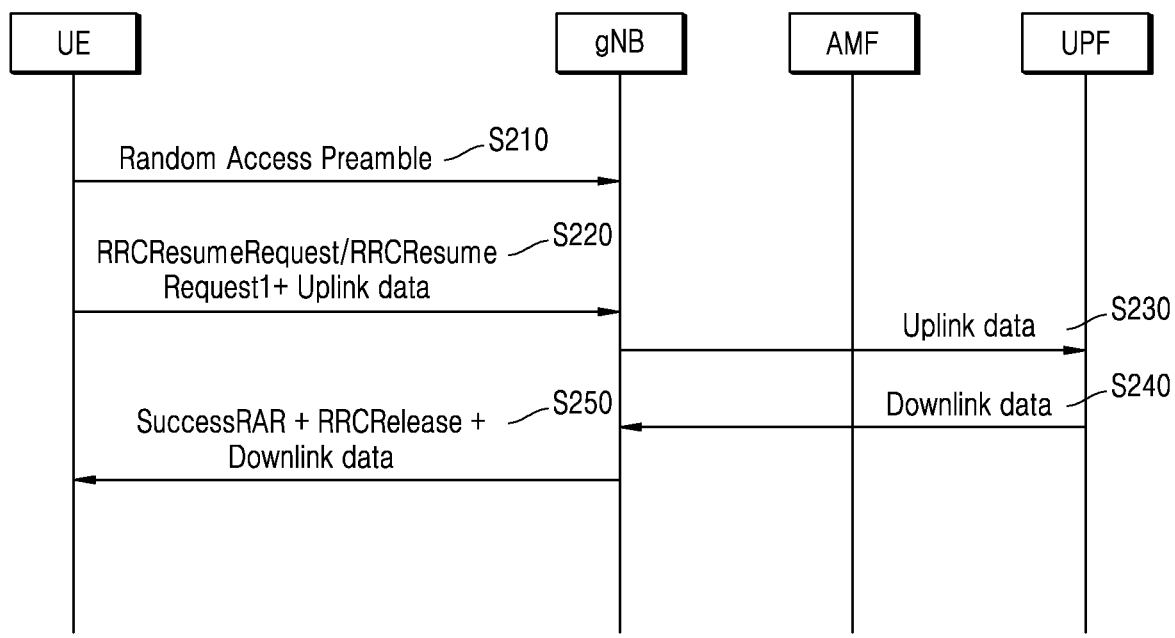
FIG. 2 illustrates an example of the signaling flow for small data transmission using 2 step RA according to an embodiment of the disclosure.

FIG. 2 illustrates an example of the signaling flow for small data transmission using 2 step RA according to an embodiment of the disclosure.

In case that a criteria to initiate the 2 step RA for SDT is met, the UE selects preamble/RO/PO from preambles/ROs/POs for SDT. The UE transmits random access preamble (S210).

In the MsgA payload, the UE sends an RRCResumeRequest/RRCResumeRequest1 to the gNB (same as the last serving GNB) on SRB 0 (S220). It includes full/short I-RNTI (resumeIdentity), the resume cause (resumeCause), and an authentication token (resumeMAC-I). The I-RNTI (short or full I-RNTI) is used for context identification and its value shall be the same as the I-RNTI that the UE had received from the last serving gNB in the RRCRelease with suspendConfig message.

The UE resumes all SRBs and DRBs, derives new security keys using the NextHopChainingCount provided in the RRCRelease message of the previous RRC connection and re-establishes the AS security. The user data are ciphered and integrity protected (only for DRBs configured with UP integrity protection) and transmitted on DTCH multiplexed with the RRCResumeRequest/RRCResumeRequest1 message on CCCH/CCCH1.

The gNB validates the resumeMAC-I and delivers the uplink data to the UPF (S230).

The gNB sends the RRCRelease message to keep the UE in RRC_INACTIVE in MsgB along with successRAR. The PDCCH is addressed to the C-RNTI. If downlink data is available (S240), they are sent ciphered and integrity protected (only for DRBs configured with UP integrity protection) on DTCH multiplexed with the RRCRelease message on DCCH (S250). The gNB may decide not to send the RRCRelease message together with successRAR. In this case upon completion of random access, the UE monitors the PDCCH addressed to the C-RNTI. UL/DL data can be exchanged between the UE and the gNB until the RRCRelease message is received or the SDT procedure is terminated.

Figure 3:
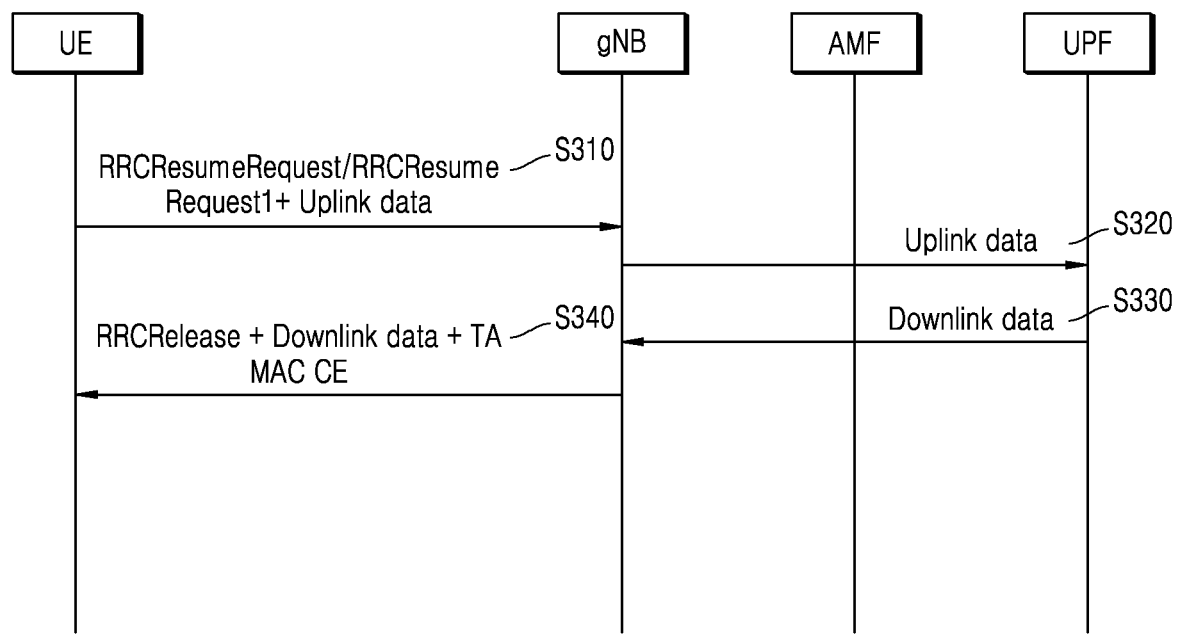
FIG. 3 illustrates an example of signaling flow for small data transmission using preconfigured PUSCH resource according to an embodiment of the disclosure.

FIG. 3 illustrates an example of signaling flow for small data transmission using preconfigured PUSCH resource according to an embodiment of the disclosure.

In case that a criteria to initiate SDT using preconfigured PUSCH resources is met, in the preconfigured PUSCH resource, the UE sends an RRCResumeRequest/RRCResumeRequest1 to the gNB (same as the last serving GNB) on SRB 0 (S310). It includes full/short I-RNTI (resumeIdentity), the resume cause (resumeCause), and an authentication token (resumeMAC-I). The I-RNTI (short or full I-RNTI) is used for context identification and its value shall be the same as the I-RNTI that the UE had received from the last serving gNB in the RRCRelease with suspendConfig message.

The UE resumes all SRBs and DRBs, derives new security keys using the NextHopChainingCount provided in the RRCRelease message of the previous RRC connection and re-establishes the AS security. The user data are ciphered and integrity protected (only for DRBs configured with UP integrity protection) and transmitted on DTCH multiplexed with the RRCResumeRequest/RRCResumeRequest1 message on CCCH.

The UE can alternately transmit its small data by using one of the following options:
- RRCResumeRequest (or new RRC message). resumeIdentity, ResumeMAC-I, resumeCause, NAS container in RRCResumeRequest/RRCResumeRequest1. NAS container includes UL data.
- new MAC CE (resumeIdentity, ResumeMAC-I)+uplink data (on DTCH). resumeIdentity is provided for UE identification purpose. ResumeMAC-I is for security The gNB validates the resumeMAC-I and delivers the uplink data to the UPF (S320).

The gNB sends the RRCRelease message to keep the UE in RRC_INACTIVE. The PDCCH is addressed to the C-RNTI. The C-RNTI is the one which the UE used in the cell from which it received preconfigured PUSCH resources. Alternately, the C-RNTI can be assigned along with pre-configured PUSCH resources. If downlink data is available (S330), they are sent ciphered and integrity protected (only for DRBs configured with UP integrity protection) on DTCH multiplexed with the RRCRelease message on DCCH (S340).

In the response of the small data transmission, the UE can receive a signal (RRC message or DCI) for the following purpose: releasing pre-configured PUSCH or switching to Resume procedure (i.e., RRC_CONNECTED).

Sidelink Communication: 4G and 5G wireless communication system supports vehicular communication services. The vehicular communication services, represented by V2X services, can consist of the following four different types: vehicle to vehicle (V2V), vehicle to infrastructure (V2I), vehicle to network (V2N) and vehicle to pedestrian (V2P). In the fifth generation (also referred as NR or New Radio) wireless communication system, V2X communication is being enhanced to support enhanced V2X use cases, which are broadly arranged into four use case groups:

1) Vehicles Platooning enables the vehicles to dynamically form a platoon travelling together. All the vehicles in the platoon obtain information from the leading vehicle to manage this platoon. This information allows the vehicles to drive closer than normal in a coordinated manner, going in the same direction and travelling together.

2) Extended Sensors enables the exchange of raw or processed data gathered through local sensors or live video images among vehicles, road site units, devices of pedestrian and V2X application servers. The vehicles can increase the perception of their environment beyond that of what their own sensors can detect and have a broader and holistic view of the local situation. High data rate is one of the key characteristics.

3) Advanced Driving enables semi-automated or full-automated driving. Each vehicle and/or RSU shares its own perception data obtained from its local sensors with vehicles in proximity and that allows vehicles to synchronize and coordinate their trajectories or maneuvers. Each vehicle shares its driving intention with vehicles in proximity too.

4) Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

Figure 4:
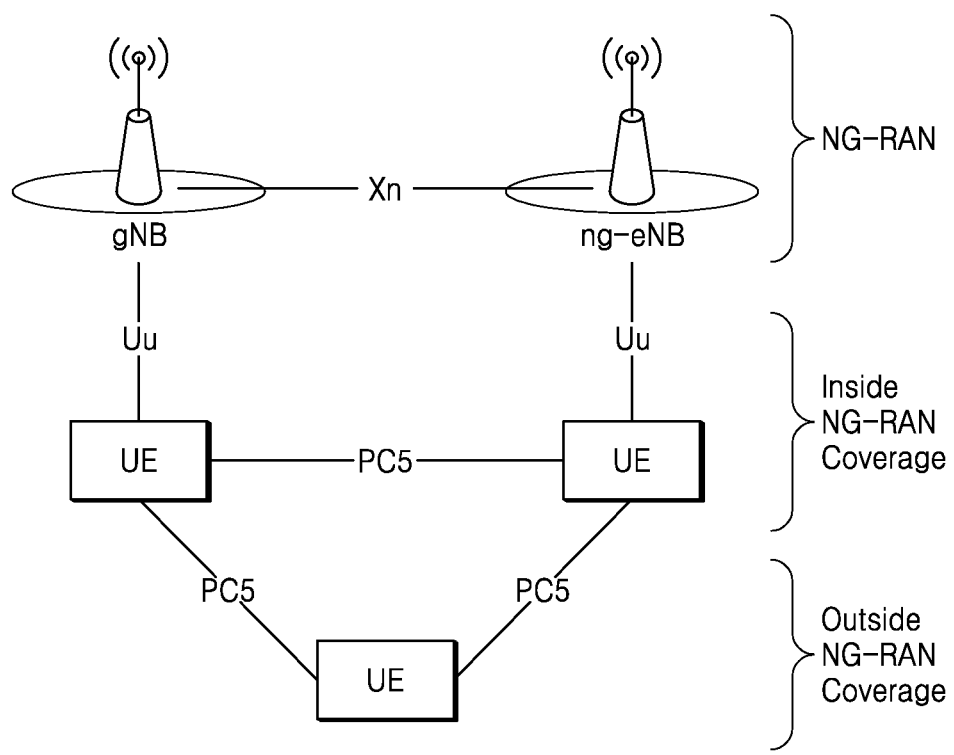
FIG. 4 illustrates a PC5 interface for supporting V2X services according to an embodiment of the disclosure.

FIG. 4 illustrates a PC5 interface for supporting V2X services according to an embodiment of the disclosure.

The V2X services can be provided by the PC5 interface and/or Uu interface. Support of the V2X services via the PC5 interface is provided by a NR sidelink communication or a V2X sidelink communication, which is a mode of communication whereby UEs can communicate with each other directly over the PC5 interface using NR technology or EUTRA technology respectively without traversing any network node. This communication mode is supported when the UE is served by RAN and when the UE is outside of RAN coverage. Only the UEs authorized to be used for V2X services can perform NR or V2X sidelink communication. The NG-RAN architecture supports the PC5 interface as illustrated in FIG. 4. Sidelink transmission and reception over the PC5 interface are supported when the UE is inside NG-RAN coverage, irrespective of which RRC state the UE is in, and when the UE is outside NG-RAN coverage. Support of the V2X services via the PC5 interface can be provided by NR Sidelink Communication and/or V2X Sidelink Communication. The NR Sidelink Communication may be used to support other services than the V2X services.

Recently UE-to-Network Relaying architecture is being studied where a Relay UE relays the traffic between a Remote UE and a network. The UE-to-Network Relay enables coverage extension and power saving for the Remote UE. The communication between UE-to-Network Relay and the gNB is based on 5G communication between the UE and the gNB. The communication between the Remote UE and the UE-to-Network Relay UE is based on sidelink communication. The UE-to-Network Relay UE can relay the system information to the Remote UE. According to the current UE operation, if the UE is ETWS/CMAS capable, it monitors for PWS notification in any paging occasion at least once per defaultPagingCycle. If the UE is not ETWS/CMAS capable, it does not monitor for PWS notification. So if the relay UE is not ETWS/CMAS capable, it does not monitor for PWS notification. As a result, the Relay UE cannot provide the required information to the Remote UE. So UE operation for monitoring PWS notification needs to be enhanced considering the relay operation.

The UE logs the RA report (success as well as failure case) and connection establishment failure report (connection establishment and connection resume case) in the RRC IDLE and the RRC_INACTIVE state. The UE sends these reports to the gNB in RRC CONNECTED upon request from the gNB. Currently, the UE logs the RA and connection establishment failure reports for connection establishment and resume. However, there is no logging of report for small data transmission in RRC_INACTIVE as a result the network cannot optimize the small data transmission configuration(s). The logged report needs to be enhanced considering the small data transmission procedure.

PWS Notification Via Relay UE

Figure 5:
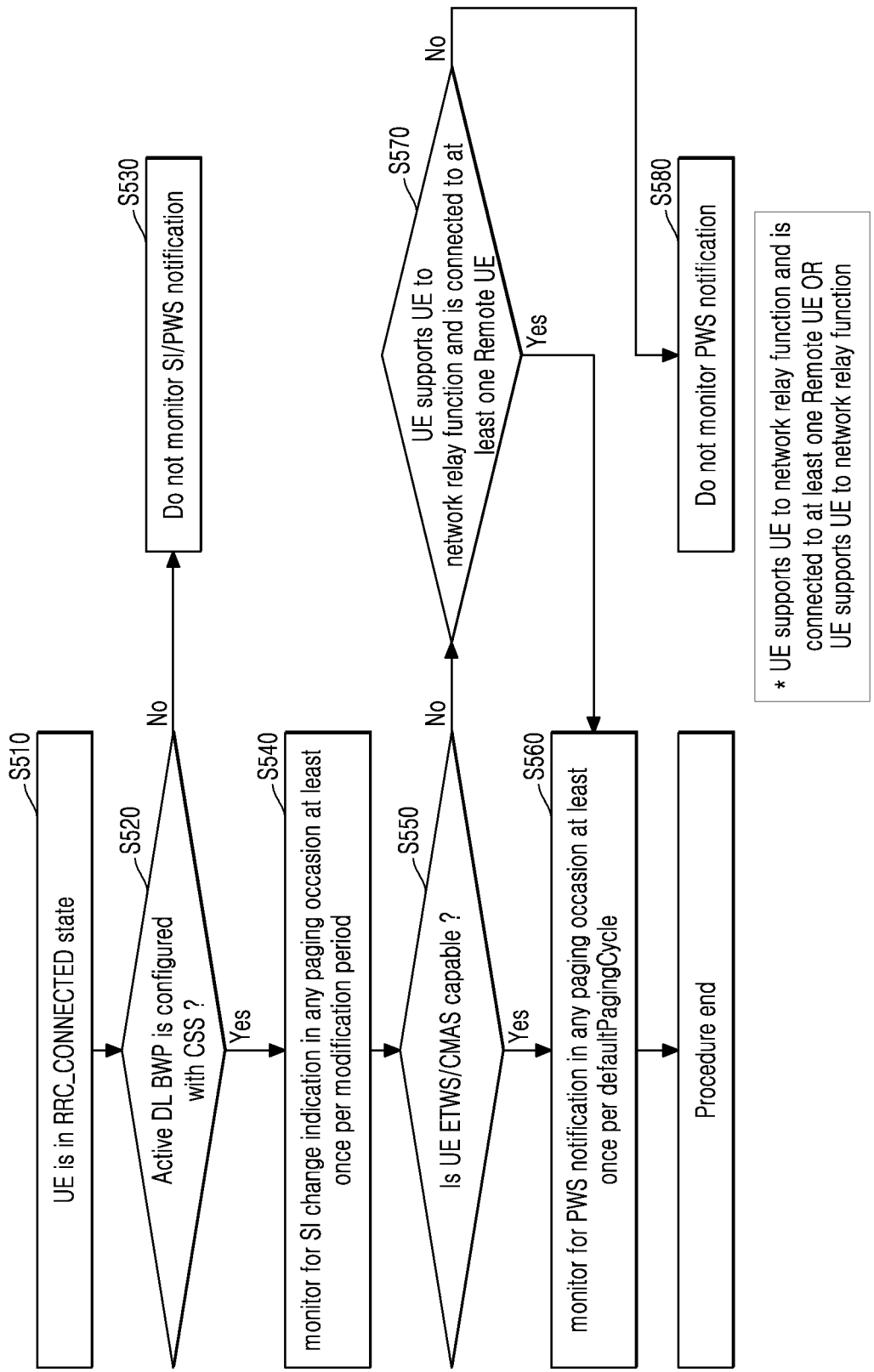
FIG. 5 illustrates a flow chart of a UE operation for monitoring the PWS (public warning system) notification and receiving ETWS (Earthquake and Tsunami Warning System) and CMAS (Commercial Mobile Alert System) SIBs from the gNB according to an embodiment of the disclosure.

FIG. 5 illustrates a flow chart of a UE operation for monitoring the PWS notification and receiving ETWS and CMAS SIBs from the gNB according to an embodiment of the disclosure.

In step S510, the UE is in the RRC_CONNECTED state.

In step S520, the UE determines whether active DL BWP is configured with a common search space (including pagingSearchSpace) to monitor paging.

In step S530, if the active DL BWP is not configured with the common search space, the UE does not monitor SI/PWS notification.

In step S540, if the active DL BWP is configured with the common search space, the UE monitors for an SI change indication in any paging occasion at least once per modification period.

In step S550, if the active DL BWP is configured with the common search space, the UE determines whether ETWS or CMAS is capable.

In step S560, if the active DL BWP is configured with the common search space and if the UE is ETWS or CMAS capable, the UE monitors for indication about PWS notification in any paging occasion at least once every defaultPagingCycle, where defaultPagingCycle is received from the gNB in system information. Monitoring indication about PWS notification means that the UE monitors the PDCCH addressed to the P-RNTI in the paging occasion. If the PDCCH addressed to the P-RNTI is received, the UE checks whether short message is included in the DCI received in the PDCCH. The short message is included in the DCI, if the short message indicator in the DCI is set to 10 or 11.

In step S570, if the active DL BWP is configured with common search space and if the UE is ETWS or CMAS capable, the UE determines whether the UE supports the UE to relay network function and is connected to at least one Remote UE.

If the active DL BWP is configured with common search space, if the UE is not ETWS or CMAS capable, if the UE supports the UE to network relay function and if the UE is connected to at least one UE (or the UE has received a request from at least one UE for at least one of SIB 6, SIB 7 and SIB 8 wherein the SIB 6 contains primary ETWS notification, SIB 7 contains secondary ETWS notification and SIB 8 contains CMAS notification; or the UE has received a request from at least one UE for monitoring at least one of ETWS or CMAS notification; note that request is received by the UE from another UE over sidelink using the RRC message or the MAC CE) [alternate: if the active DL BWP is configured with common search space and if the UE is connected to at least one UE (or the UE has received a request from at least one UE for at least one of SIB 6, SIB 7 and SIB 8 wherein the SIB 6 contains primary ETWS notification, SIB 7 contains secondary ETWS notification and SIB 8 contains CMAS notification; or UE has received request from at least one UE for monitoring at least one of ETWS or CMAS notification; note that request is received by UE from another UE over sidelink using the RRC message or the MAC CE)]:

the UE monitors for indication about PWS notification in any paging occasion at least once every defaultPagingCycle, where defaultPagingCycle is received from the gNB in system information. Note that there can be multiple paging occasions in the paging cycle. Monitoring indication about PWS notification means that the UE monitors the PDCCH addressed to the P-RNTI in the paging occasion. If the PDCCH addressed to the P-RNTI is received, the UE checks whether short message is included in the DCI received in the PDCCH. The short message is included in the DCI, if the short message indicator in the DCI is set to 10 or 11.

In step S580, if the active DL BWP is configured with common search space, if the UE is not ETWS or CMAS capable, if the UE does not support the UE to network relay function or if the UE is not connected to at least one UE, the UE does not monitor PWS notification.

In case the UE monitors for PWS notification (as per conditions described above) in any paging occasion at least once every defaultPagingCycle:

If short message is included in the DCI and a bit corresponding to etwsAndCmasIndication in the short message is set to 1, If the UE is provided with searchSpaceSIB1 and searchSpaceOtherSystemInformation on the active BWP or the initial BWP:

immediately re-acquire the SIB1;

if the UE is ETWS capable and si-SchedulingInfo in SIB 1 includes scheduling information for SIB6; or if the UE supports the UE to network relay function and if the UE is connected to at least one relay UE (or the UE has received a request from at least one UE for SIB 6 or the UE has received a request from at least one UE for monitoring ETWS notification or for ETWS SIB(s))

acquire SIB6, immediately;

Upon acquiring SIB 6, the UE sends the SIB 6 over the side link (using the RRC message or the MAC CE) to one or more UE(s) which has requested for ETWS SIB(s) or SIB 6 or ETWS notification. The UE also forwards the received warning message in SIB 6 to the upper layer (i.e., NAS) if the UE is ETWS capable. Note that if the UE is not ETWS capable, it does not extract the warning message from SIB 6 and does not forward the received warning message in SIB 6 to the upper layer.

if the UE is ETWS capable and si-SchedulingInfo in SIB 1 includes scheduling information for SIB7; or if the UE supports the UE to network relay function and if the UE is connected to at least one relay UE (or the UE has received a request from at least one UE for SIB 7; or the UE has received a request from at least one UE for monitoring ETWS notification or for ETWS SIB(s))

acquire SIB7, immediately;

Upon acquiring SIB 7, the UE sends the SIB 7 over the side link (using the RRC message or the MAC CE) to one or more UE(s) which has requested for ETWS SIB(s) or SIB 7 or ETWS notification. The UE also extracts the warning message from SIB 7 and forwards the received warning message in SIB 7 to the upper layer (i.e., NAS) if the UE is ETWS capable. If the UE is not ETWS capable, it does not extract the warning message from SIB 7 and does not forward the received warning message in SIB 7 to the upper layer.

if the UE is CMAS capable and si-SchedulingInfo in SIB 1 includes scheduling information for SIB8; or if the UE supports the UE to network relay function and if the UE is connected to at least one relay UE (or the UE has received request from at least one UE for SIB 8 or UE has received request from at least one UE for monitoring CMAS notification or for CMAS SIB(s))

acquire SIB8, immediately;

Upon acquiring SIB 8, UE send the SIB 8 over the side link (using the RRC message or the MAC CE) to one or more UE(s) which has requested for CMAS SIB(s) or SIB 8 or CMAS notification. UE also forward the received warning message in SIB 8 to the upper layer (i.e., NAS) if the UE is CMAS capable. Note that if the UE is not CMAS capable, it does not extract the warning message from SIB 8 and forward the received warning message in SIB 8 to the upper layer.

In case the UE receives the RRCReconfiguration message including at least one of SIB 6, SIB 7 and SIB 8:

If SIB 6 is included in the RRCReconfiguration message UE send the SIB 6 over the side link (using the RRC message or the MAC CE) to one or more UE(s) which has requested for ETWS SIB(s) or SIB 6 or ETWS notification. UE extracts the warning message from SIB 6 and UE also forward the received warning message in SIB 6 to the upper layer (i.e., NAS) if the UE is ETWS capable. Note that if the UE is not ETWS capable, it does not extract the warning message from SIB 6 and does not forward the received warning message in SIB 6 to the upper layer.

If SIB 7 is included in the RRCReconfiguration message The UE sends the SIB 7 over the side link (using the RRC message or the MAC CE) to one or more UE(s) which has requested for ETWS SIB(s) or SIB 7 or ETWS notification. The UE also extracts the warning message from SIB 7 and forwards the received warning message in SIB 7 to the upper layer (i.e., NAS) if the UE is ETWS capable. Note that if the UE is not ETWS capable, it does not extract the warning message from SIB 7 and does not forward the received warning message in SIB 7 to the upper layer.

If SIB 8 is included in the RRCReconfiguration message The UE sends the SIB 8 over the side link (using the RRC message or the MAC CE) to one or more UE(s) which has requested for CMAS SIB(s) or SIB 8 or CMAS notification. The UE extracts the warning message from SIB 8 and the UE also forwards the received warning message in SIB 8 to the upper layer (i.e., NAS) if the UE is CMAS capable. Note that if the UE is not CMAS capable, it does not extract the warning message from SIB 8 and forward the received warning message in SIB 8 to the upper layer.

Figure 6:
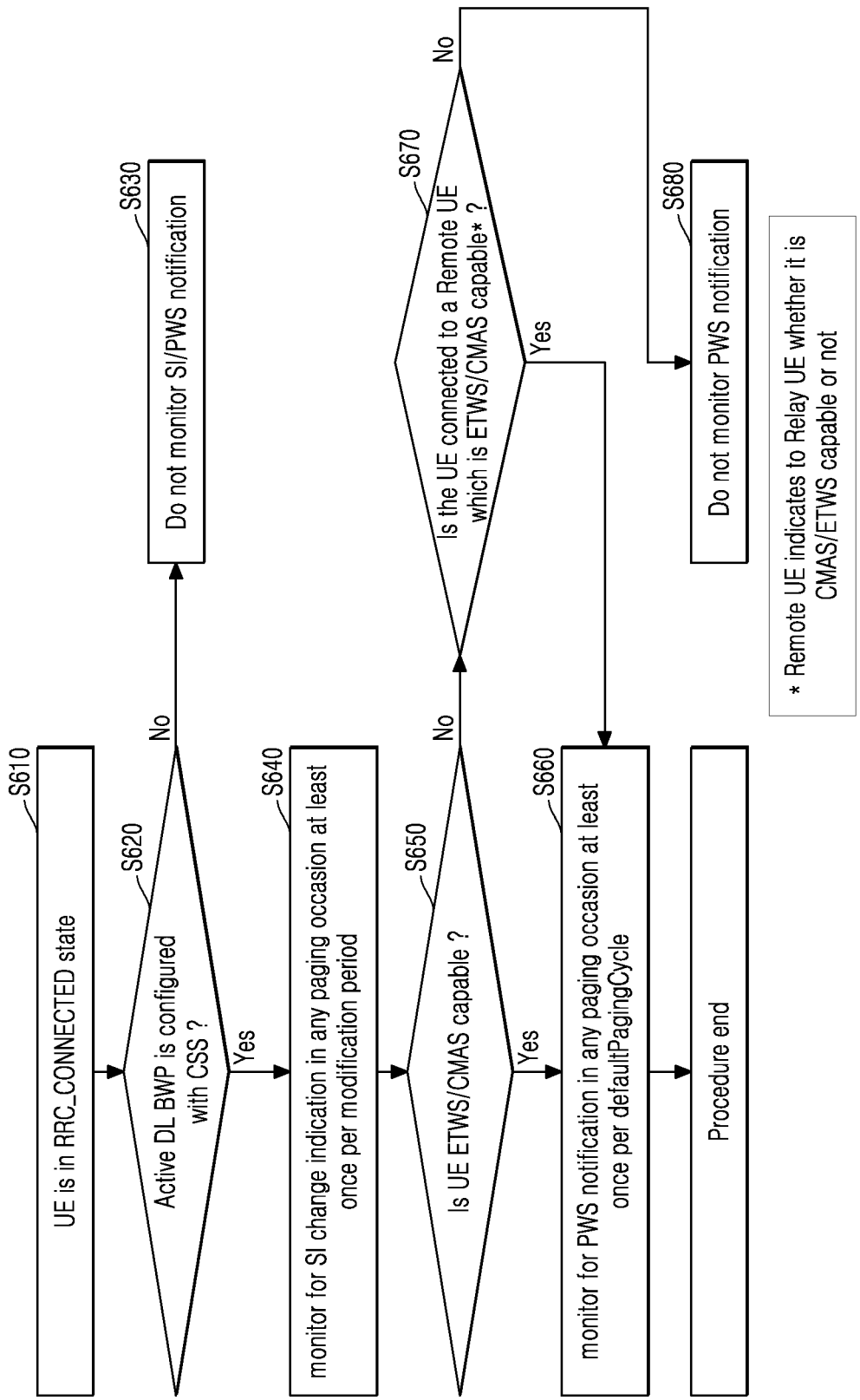
FIG. 6 illustrates a flow chart of a UE operation for monitoring PWS notification and receiving ETWS and CMAS SIBs from the gNB according to an embodiment of the disclosure.

FIG. 6 illustrates a flow chart of a UE operation for monitoring PWS notification and receiving ETWS and CMAS SIBs from the gNB according to an embodiment of the disclosure.

In step S610, the UE is in the RRC_CONNECTED state

In step S620, the UE determines whether active DL BWP is configured with a common search space (including pagingSearchSpace) to monitor paging.

In step S630, if the active DL BWP is not configured with the common search space, the UE do not monitor SI/PWS notification.

In step S640, if the active DL BWP is configured with the common search space, the UE monitors for an SI change indication in any paging occasion at least once per modification period.

In step S650, if the active DL BWP is configured with the common search space, the UE determines whether ETWS or CMAS is capable.

In step S660, if the active DL BWP is configured with the common search space and if the UE is ETWS or CMAS capable: the UE monitors for indication about PWS notification in any paging occasion at least once every defaultPagingCycle, where defaultPagingCycle is received from gNB in system information. Monitoring indication about PWS notification means that the UE monitors the PDCCH addressed to the P-RNTI in the paging occasion. If the PDCCH addressed to the P-RNTI is received, the UE checks whether the short message is included in the DCI received in the PDCCH. The short message is included in the DCI, if the short message indicator in the DCI is set to 10 or 11.

In step S670, if the active DL BWP is configured with common search space and if the UE is ETWS or CMAS capable, the UE determines whether the UE is connected to a Remote UE which is ETWS/CMAS capable.

If the active DL BWP is configured with common search space, if the UE is not ETWS or CMAS capable, if the UE supports the UE to network relay function and if the UE is connected to at least one UE which is at least one of ETWS or CMAS capable (the UE receives the ETWS/CMAS capability of another UE over sidelink using the RRC message or the MAC CE) [Alternate: if the active DL BWP is configured with common search space and if the UE is connected to at least one UE which is at least one of ETWS or CMAS capable (the UE receives the ETWS/CMAS capability of another UE over sidelink using the RRC message or the MAC CE)]:

the UE monitors for indication about PWS notification in any paging occasion at least once every defaultPagingCycle, where defaultPagingCycle is received from the gNB in system information. Note that there can be multiple paging occasions in the paging cycle. Monitoring indication about PWS notification means that the UE monitors the PDCCH addressed to the P-RNTI in the paging occasion. If the PDCCH addressed to the P-RNTI is received, the UE checks whether the short message is included in the DCI received in the PDCCH. The short message is included in the DCI, if the short message indicator in the DCI is set to 10 or 11.

In step S680, if the active DL BWP is configured with common search space, if the UE is not ETWS or CMAS capable, if the UE does not support the UE to network relay function or if the UE is not connected to the at least one UE which is at least one of ETWS or CMAS capable, the UE does not monitor PWS notification.

If the active DL BWP is configured with common search space and if the UE supports the UE to network relay function and if the UE is connected to at least one UE which is at least one of ETWS or CMAS capable (the UE receives the ETWS/CMAS capability of another UE over sidelink using the RRC message or the MAC CE) [Alternate: if the active DL BWP is configured with common search space and if the UE is connected to at least one UE which is at least one of ETWS or CMAS capable (the UE receives the ETWS/CMAS capability of another UE over sidelink using the RRC message or the MAC CE)]:

The UE monitors for indication about PWS notification in any paging occasion at least once every defaultPagingCycle, where defaultPagingCycle is received from the gNB in the system information. Note that there can be multiple paging occasions in the paging cycle. Monitoring indication about PWS notification means that the UE monitors the PDCCH addressed to the P-RNTI in the paging occasion. If the PDCCH addressed to the P-RNTI is received, the UE checks whether the short message is included in the DCI received in the PDCCH. The short message is included in the DCI, if the short message indicator in the DCI is set to 10 or 11.

Else If the active DL BWP is configured with common search space and if the UE is ETWS or CMAS capable:

The UE monitors for indication about PWS notification in any paging occasion at least once every defaultPagingCycle, where defaultPagingCycle is received from the gNB in system information. Monitoring indication about PWS notification means that the UE monitors the PDCCH addressed to the P-RNTI in the paging occasion. If the PDCCH addressed to the P-RNTI is received, the UE checks whether the short message is included in the DCI received in the PDCCH. The short message is included in the DCI, if the short message indicator in the DCI is set to 10 or 11.

Else

The UE does not monitor PWS notification

In case the UE monitors for PWS notification (as per conditions described above) in any paging occasion at least once every defaultPagingCycle:

If the short message is included in the DCI and a bit corresponding to etwsAndCmasIndication in the short message is set to 1, If the UE is provided with searchSpaceSIB1 and searchSpaceOtherSystemInformation on the active BWP or the initial BWP:

immediately re-acquire the SIB1;

if the UE is ETWS capable and si-SchedulingInfo in SIB 1 includes scheduling information for SIB6; or if the UE supports the UE to network relay function and if the UE is connected to at least one relay UE (or the UE has received a request from at least one UE for SIB 6 or the UE has received a request from at least one UE for monitoring ETWS notification or for ETWS SIB(s))

acquire SIB6, immediately;

Upon acquiring SIB 6, the UE sends the SIB 6 over the side link (using the RRC message or the MAC CE) to one or more UE(s) which has requested for ETWS SIB(s) or SIB 6 or ETWS notification. The UE extracts the warning message from SIB 6 and the UE also forward the received warning message in SIB 6 to the upper layer (i.e., NAS) if the UE is ETWS capable. Note that if the UE is not ETWS capable, it does not extract the warning message from SIB 6 and forward the received warning message in SIB 6 to the upper layer.

if the UE is ETWS capable and si-SchedulingInfo in SIB 1 includes scheduling information for SIB7; or if the UE supports the UE to network relay function and if the UE is connected to at least one relay UE (or the UE has received a request from at least one UE for SIB 7; or the UE has received a request from at least one UE for monitoring ETWS notification or for ETWS SIB(s))

acquire SIB7, immediately;

Upon acquiring SIB 7, the UE sends the SIB 7 over the side link (using the RRC message or the MAC CE) to one or more UE(s) which has requested for ETWS SIB(s) or SIB 7 or ETWS notification. The UE also extracts the warning message from SIB 7 and forwards the received warning message in SIB 7 to the upper layer (i.e., NAS) if the UE is ETWS capable. Note that if the UE is not ETWS capable, it does not extract the warning message from SIB 7 and forward the received warning message in SIB 7 to the upper layer.

if the UE is CMAS capable and si-SchedulingInfo in SIB 1 includes scheduling information for SIB8; or if the UE supports the UE to network relay function and if the UE is connected to at least one relay UE (or the UE has received a request from at least one UE for SIB 8 or the UE has received a request from at least one UE for monitoring CMAS notification or for CMAS SIB(s))

acquire SIB8, immediately;

Upon acquiring SIB 8, the UE sends the SIB 8 over the side link (using the RRC message or the MAC CE) to one or more UE(s) which has requested for CMAS SIB(s) or SIB 8 or CMAS notification. The UE extracts the warning message from SIB 8 and the UE also forwards the received warning message in SIB 8 to the upper layer (i.e., NAS) if the UE is CMAS capable. If the UE is not CMAS capable, it does not extract the warning message from SIB 8 and forward the received warning message in SIB 8 to the upper layer.

In case the UE receives the RRCReconfiguration message including at least one of SIB 6, SIB 7 and SIB 8:

If SIB 6 is included in the RRCReconfiguration message
The UE sends the SIB 6 over the side link (using the RRC message or the MAC CE) to one or more UE(s) which has requested for ETWS SIB(s) or SIB 6 or ETWS notification. The UE also forwards the received warning message in SIB 6 to the upper layer (i.e., NAS) if the UE is ETWS capable. Note that if the UE is not ETWS capable, it does not extract the warning message from SIB 6 and does not forward the received warning message in SIB 6 to the upper layer.

If SIB 7 is included in the RRCReconfiguration message
The UE sends the SIB 7 over the side link (using the RRC message or the MAC CE) to one or more UE(s) which has requested for ETWS SIB(s) or SIB 7 or ETWS notification. UE also extracts the warning message from SIB 7 and forward the received warning message in SIB 7 to the upper layer (i.e., NAS) if the UE is ETWS capable. Note that if the UE is not ETWS capable, it does not extract the warning message from SIB 7 and does not forward the received warning message in SIB 7 to the upper layer.

If SIB 8 is included in the RRCReconfiguration message
The UE sends the SIB 8 over the side link (using the RRC message or the MAC CE) to one or more UE(s) which has requested for CMAS SIB(s) or SIB 8 or CMAS notification. The UE also forwards the received warning message in SIB 8 to the upper layer (i.e., NAS) if the UE is CMAS capable. Note that if the UE is not CMAS capable, it does not extract the warning message from SIB 8 and forward the received warning message in SIB 8 to the upper layer.

(Alternate) In case the UE receives RRCReconfiguration message including at least one of SIB 6, SIB 7 and SIB 8:

If SIB 6 is included in the RRCReconfiguration message
If the UE is ETWS capable; or if the UE supports the UE to network relay function and if the UE is connected to at least one relay UE (or the UE has received a request from at least one UE for SIB 6 or UE has received a request from at least one UE for monitoring ETWS notification or for ETWS SIB(s))
the UE obtains the SIB 6 from RRCReconfiguration message
if the UE supports the UE to network relay function and if the UE is connected to at least one relay UE (or the UE has received a request from at least one UE for SIB 6 or UE has received a request from at least one UE for monitoring ETWS notification or for ETWS SIB(s))
the UE sends the SIB 6 over the side link (using the RRC message or the MAC CE) to one or more UE(s) which has requested for ETWS SIB(s) or SIB 6 or ETWS notification.
the UE extracts the warning message from SIB 6 and UE forward the received warning message in SIB 6 to the upper layer (i.e., NAS) if the UE is ETWS capable. Note that if the UE is not ETWS capable, it does not extract the warning message from SIB 6 and does not forward the received warning message in SIB 6 to the upper layer.

If SIB 7 is included in the RRCReconfiguration message
If the UE is ETWS capable; or if the UE supports the UE to network relay function and if the UE is connected to at least one relay UE (or the UE has received a request from at least one UE for SIB 7 or UE has received a request from at least one UE for monitoring ETWS notification or for ETWS SIB(s))
the UE obtains the SIB 7 from RRCReconfiguration message
if the UE supports the UE to network relay function and if the UE is connected to at least one relay UE (or the UE has received a request from at least one UE for SIB 7 or UE has received a request from at least one UE for monitoring ETWS notification or for ETWS SIB(s))
the UE sends the SIB 7 over the side link (using the RRC message or the MAC CE) to one or more UE(s) which has requested for ETWS SIB(s) or SIB 7 or ETWS notification.
the UE extracts the warning message from SIB 7 and forward the received warning message in SIB 7 to the upper layer (i.e., NAS) if the UE is ETWS capable. Note that if the UE is not ETWS capable, it does not extract the warning message from SIB 7 and does not forward the received warning message in SIB 7 to the upper layer.

If SIB 8 is included in the RRCReconfiguration message
If the UE is CMAS capable; or if the UE supports the UE to network relay function and if the UE is connected to at least one relay UE (or the UE has received a request from at least one UE for SIB 8 or UE has received a request from at least one UE for monitoring CMAS notification or for CMAS SIB(s))
the UE obtains the SIB 8 from RRCReconfiguration message
if the UE supports the UE to network relay function and if the UE is connected to at least one relay UE (or the UE has received a request from at least one UE for SIB 8 or UE has received a request from at least one UE for monitoring CMAS notification or for CMAS SIB(s))
the UE sends the SIB 8 over the side link (using the RRC message or the MAC CE) to one or more UE(s) which has requested for CMAS SIB(s) or SIB 8 or CMAS notification.

the UE extracts the warning message from SIB 8 and UE also forward the received warning message in SIB 8 to the upper layer (i.e., NAS) if the UE is CMAS capable. Note that if the UE is not CMAS capable, it does not extract the warning message from SIB 8 and forward the received warning message in SIB 8 to the upper layer.

RA and Connection establishment failure report enhancements

Figure 7:
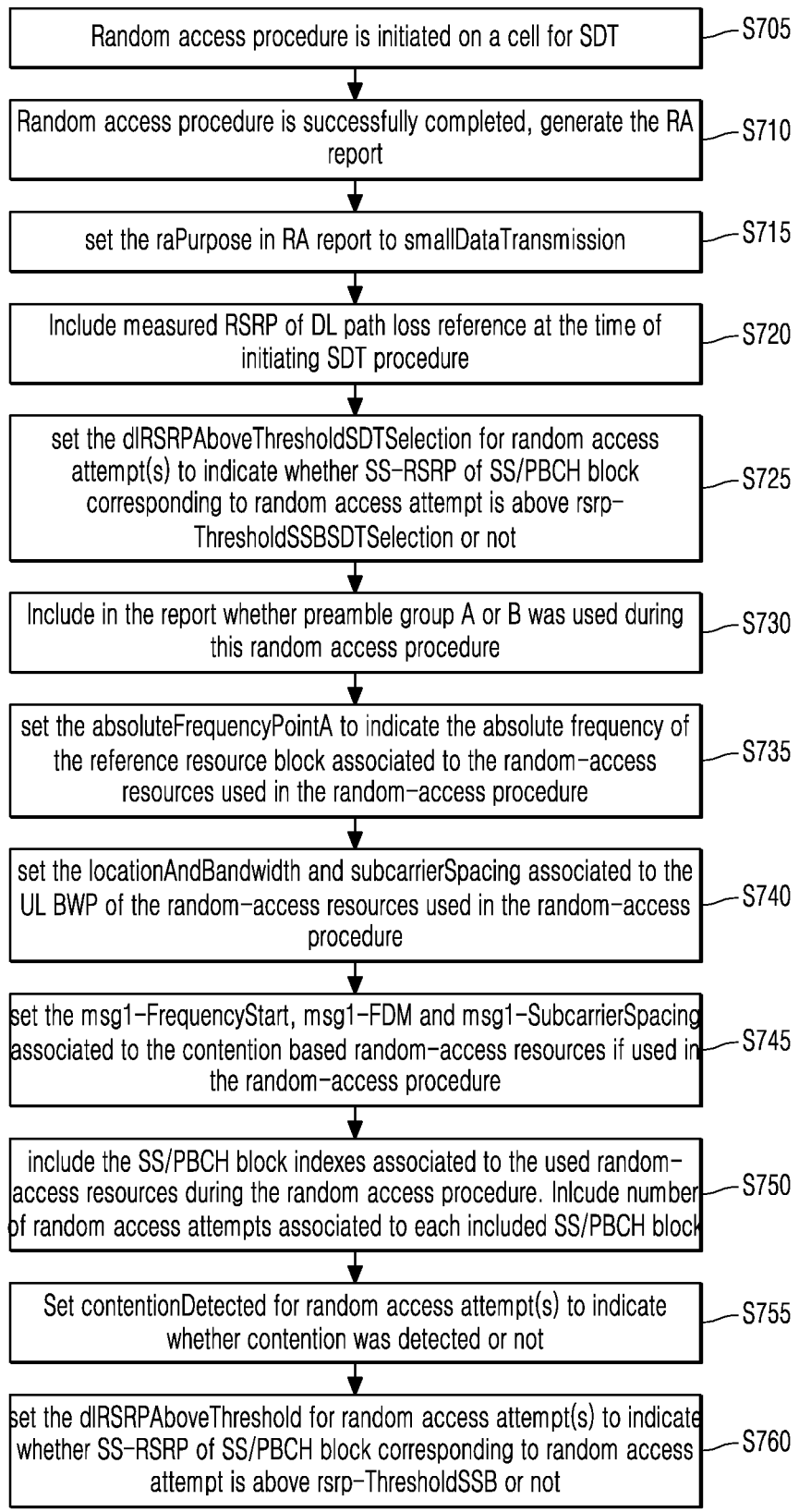
FIG. 7 illustrates a flow chart of a UE operation for logging the random access report according to an embodiment of the disclosure.

FIG. 7 illustrates a flow chart of a UE operation for logging the random access report according to an embodiment of the disclosure.

The UE is in the RRC_INACTIVE state. While the UE is in the RRC_INACTIVE state, the UE initiates the random access procedure for small data transmission (S705) if data becomes available for one or more radio bearers for which small data transmission is allowed/configured and if available data volume in SDT radio bearers is <=data volume threshold and DL RSRP (RSRP of the downlink pathloss reference i.e., SSB) is greater than or equal to a configured threshold (threshold is signalled by the gNB in the system information or the RRC message) and criteria initiate random access procedure for small data transmission is met. The radio bearers for which small data transmission is allowed/configured is signalled (using the RRC message such as the RRC Release message or the RRC Reconfiguration message) by the gNB when the UE was in the RRC_CONNECTED state.

Criteria Initiate Random Access Procedure for Small Data Transmission

If the camped cell is configured with supplementary uplink and if the RSRP of the downlink pathloss reference is less than a configured threshold (threshold is signalled by the gNB in the system information or the RRC message): select the SUL carrier. Otherwise select NUL.

If the BWP for small data transmission (i.e., initial BWP of selected UL carrier) is configured with only 4-step RA type Random Access Resources for SDT; or if the BWP for small data transmission (i.e., initial BWP of selected UL carrier) is configured with both 2-step and 4-step RA type Random Access Resources for SDT and the RSRP of the downlink pathloss reference is not above a configured threshold: the UE performs 4 step RA for small data transmission.

If the BWP for small data transmission (i.e., initial BWP of selected UL carrier) is configured with only 2-step RA type Random Access Resources for SDT; or if the BWP for small data transmission (i.e., initial BWP of selected UL carrier) is configured with both 2-step and 4-step RA type Random Access Resources for SDT and the RSRP of the downlink pathloss reference is above a configured threshold: the UE performs 4 step RA for small data transmission.

When the random access procedure is successfully completed (i.e., contention resolution is successful), the UE generates the random access report (S710) as follows:

include the 'raPurpose' and set it to 'Small Data Transmission' to indicate that this RA report is for random access procedure which was initiated for small data transmission. (S715)

Include the measured RSRP of DL path loss reference at the time of initiating the small data transmission procedure (S720)

Include dlRSRPAboveThresholdSDTSelection for each random access attempt and set it to indicate whether SS-RSRP of SS/PBCH block corresponding to random access attempt is above rsrp-ThresholdSSBSDTSelection or not. (S725) The rsrp-ThresholdSSBSDTSelection is signalled by the gNB in system information or the RRC message. dlRSRPAboveThresholdSDTSelection for a random access attempt is set to true if SS-RSRP of SS/PBCH block corresponding to random access attempt is above rsrp-ThresholdSSBSDTSelection. Otherwise, it is not included or is set to false.

Include in the report whether preamble group A or B was used during this random access procedure (S730)

set the absoluteFrequencyPointA to indicate the absolute frequency of the reference resource block associated to the random-access resources used in the random-access procedure; (S735)

set the locationAndBandwidth and subcarrierSpacing associated to the UL BWP of the random-access resources used in the random-access procedure; (S740)

set the msg1-FrequencyStart, msg1-FDM and msg1-SubcarrierSpacing associated to the contention based random-access resources if used in the random-access procedure; (S745)

set the msgA-FrequencyStart, msgA-FDM and msgA-SubcarrierSpacing associated to the contention based random-access resources if used in the random-access procedure;

include the SS/PBCH block indexes associated to the used random-access resources during the random access procedure. Include number of random access attempts associated to each included SS/PBCH block (S750)

set contentionDetected for random access attempt(s) to indicate whether contention was detected or not (S755)

set the dlRSRPAboveThreshold for random access attempt(s) to indicate whether SS-RSRP of SS/PBCH block corresponding to random access attempt is above rsrp-ThresholdSSB or not (S760)

set the cellId to the global cell identity and the tracking area code, if available, otherwise to the physical cell identity and carrier frequency of the cell in which the corresponding random-access preamble was transmitted.

Later, when the UE enters the RRC connected state, the UE forwards the logged report to the gNB when requested.

Meanwhile, the aforementioned order of steps for generating the RA report is an example, the method for generating the RA report is not limited thereto.

In one method of this disclosure the UE operation for logging the random access report is as follows.

The UE is in the RRC_INACTIVE/RRC_IDLE state. While the UE is in the RRC_INACTIVE/IDLE state, the UE initiates the random access procedure.

When the random access procedure is successfully completed (i.e., contention resolution is successful), the UE generates the random access report as follows:

set the cellId to the global cell identity and the tracking area code, if available, otherwise to the physical cell identity and carrier frequency of the cell in which the corresponding random-access preamble was transmitted.

If this random access procedure was initiated for small data transmission:

include the 'raPurpose' and set it to 'Small Data Transmission' to indicate that this RA report is for random access procedure which was initiated for small data transmission.

Include the measured RSRP of DL path loss reference at the time of initiating the small data transmission procedure.

Include dlRSRPAboveThresholdSDTSelection for each random access attempt and set it to indicate whether SS- RSRP of SS/PBCH block corresponding to random access attempt is above rsrp-ThresholdSSBSDTSelection or not. Rsrp-ThresholdSSBSDTSelection is signalled by GNB in system information or RRC message. dlRSRPAboveThresholdSDTSelection for a random access attempt is set to true if SS-RSRP of SS/PBCH block corresponding to random access attempt is above rsrp-ThresholdSSBSDTSelection. Otherwise, it is not included or is set to false.
  set the absoluteFrequencyPointA to indicate the absolute frequency of the reference resource block associated to the random-access resources used in the random-access procedure;
  set the locationAndBandwidth and subcarrierSpacing associated to the UL BWP of the random-access resources used in the random-access procedure;
  set the msg1-FrequencyStart, msg1-FDM and msg1-SubcarrierSpacing associated to the contention based random-access resources if used in the random-access procedure;
  set the msgA-FrequencyStart, msgA-FDM and msgA-SubcarrierSpacing associated to the contention based random-access resources if used in the random-access procedure;
  include the SS/PBCH block indexes associated to the used random-access resources during the random access procedure. Include number of random access attempts associated to each included SS/PBCH block;
  set contentionDetected for random access attempt(s) to indicate whether contention was detected or not;
  set the dlRSRPAboveThreshold for random access attempt(s) to indicate whether SS-RSRP of SS/PBCH block corresponding to random access attempt is above rsrp-ThresholdSSB or not;
  If this random access procedure was not initiated for small data transmission and if the random access procedure is a 2 step random access procedure, the measured RSRP of DL path loss reference at the time of initiating the random access procedure is included in the random access report.
  If this random access procedure was not initiated for small data transmission and if the random access procedure is not a 2 step random access procedure, the measured RSRP of DL path loss reference at the time of initiating the random access procedure is not included in the random access report.
  Include in the report whether preamble group A or B was used during this random access procedure;
  If this random access procedure was not initiated for small data transmission: the 'raPurpose' is included in the random access report and it is set to purpose of random access procedure i.e., accessRelated, beamFailureRecovery, reconfigurationWithSync, ulUnSynchronized, schedulingRequestFailure, noPUCCHResourceAvailable, requestForOtherSI.
  Later, when the UE enters the RRC connected state, the UE forwards the logged report to gNB when requested.

Figure 8:
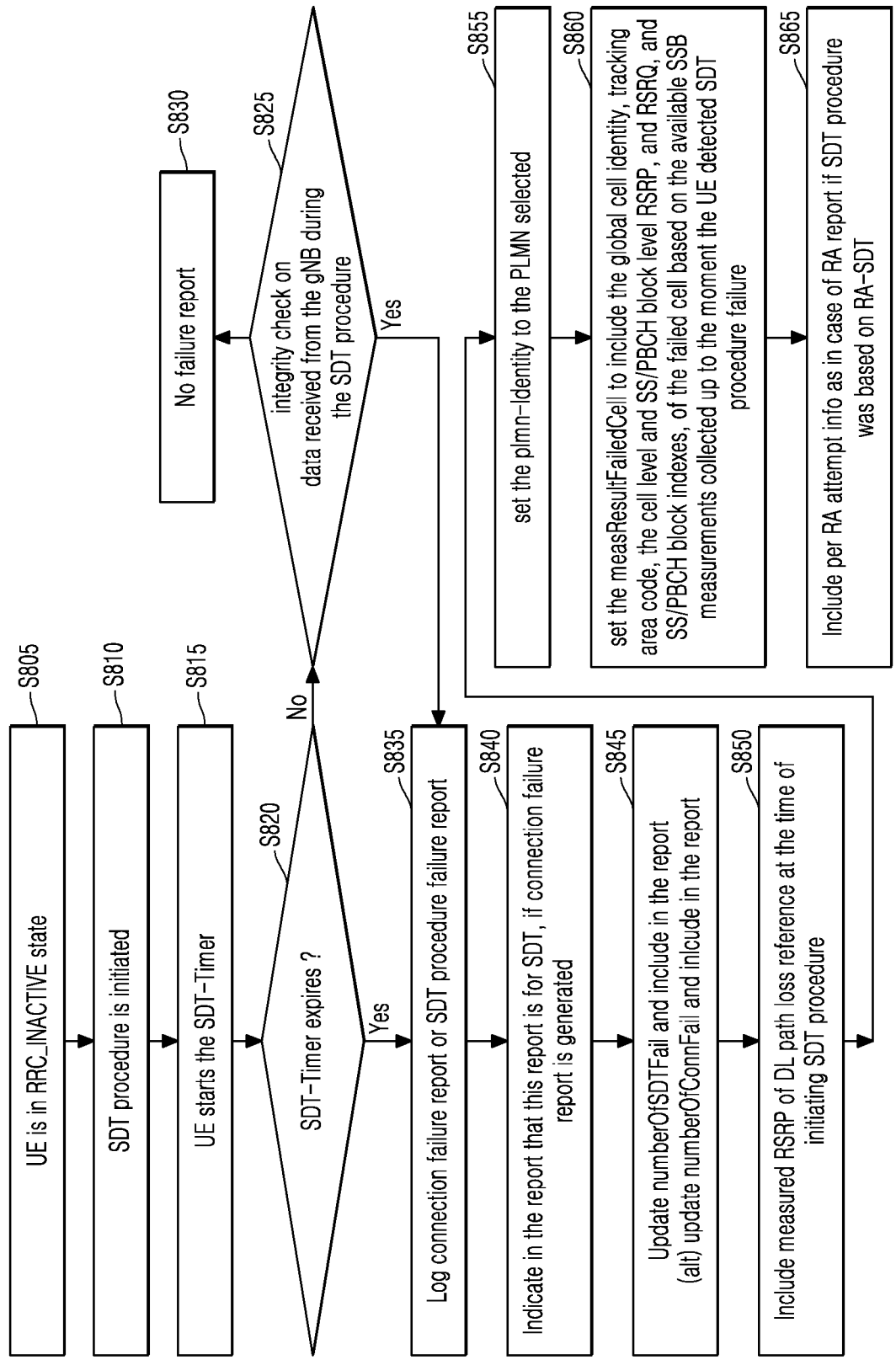
FIG. 8 illustrates a flow chart of a UE operation for logging the small data transmission failure according to an embodiment of the disclosure.

FIG. 8 illustrates a flow chart of a UE operation for logging the small data transmission failure according to an embodiment of the disclosure.

The UE is in the RRC_INACTIVE state (S805). While the UE is in the RRC_INACTIVE state, the UE initiates small data transmission procedure (S810) if data becomes available for one or more radio bearers for which small data transmission is allowed/configured and if available data volume in SDT radio bearers is <=data volume threshold and DL RSRP (RSRP of the downlink pathloss reference i.e., SSB) is greater than or equal to a configured threshold (threshold is signalled by gNB in system information or RRC message). The radio bearers for which small data transmission is allowed/configured is signalled (using the RRC message such as the RRC Release message or the RRC Reconfiguration message) by the gNB when the UE was in the RRC_CONNECTED state.

Upon initiating the small data transmission procedure, the UE starts the SDT-timer (S815). The value of the SDT-timer is signalled by the gNB in the RRC message (such as the RRC Release or the RRC reconfiguration message or SI).

The UE determines whether the SDT-timer expires (S820). While the SDT-timer is running, perform integrity check on data received from the gNB during the SDT procedure (S825). In case that the integrity check failure does not occur while the SDT timer is running, no failure report is generated (S830).

If the SDT timer expires or if integrity check failure occurs while the SDT-timer is running:
  The UE logs connection establishment failure report or SDT procedure failure report (S835). In the report the UE includes the following information:
  Indicate in the report that this report is for SDT. The UE may indicate this if the connection failure report is generated (S840).
  Increment numberOfSDTFail and include in the report. Alternately, update numberOfConnFail (i.e., increment by 1) and include in the report (S845).
  Include measured RSRP of DL path loss reference at the time of initiating SDT procedure (S850)
  set the plmn-Identity to the PLMN selected by upper layers (i.e., NAS) from the PLMN(s) included in the plmn-IdentityList in SIB1 (S855)
  set the measResultFailedCell to include the global cell identity, tracking area code, the cell level and SS/PBCH block level RSRP, and RSRQ, and SS/PBCH block indexes, of the failed cell based on the available SSB measurements collected up to the moment the UE detected SDT procedure failure (S860)
  Include per RA attempt info (as described in method 1) if random access procedure was initiated for the SDT (S865)
  Later, when the UE enters the RRC connected state, the UE forwards the logged report to the gNB when requested (request from the gNB may indicate whether it needs SDT failure report or not; if SDT failure triggers connection failure report, request from the gNB may be whether it needs connection failure report or not). When the UE sends the report to the gNB in UEInformationResponse message:
    if the report includes at least one report for SDT procedure failure, the UE indicates timeSinceSDTFailure in the report.

Figure 9:
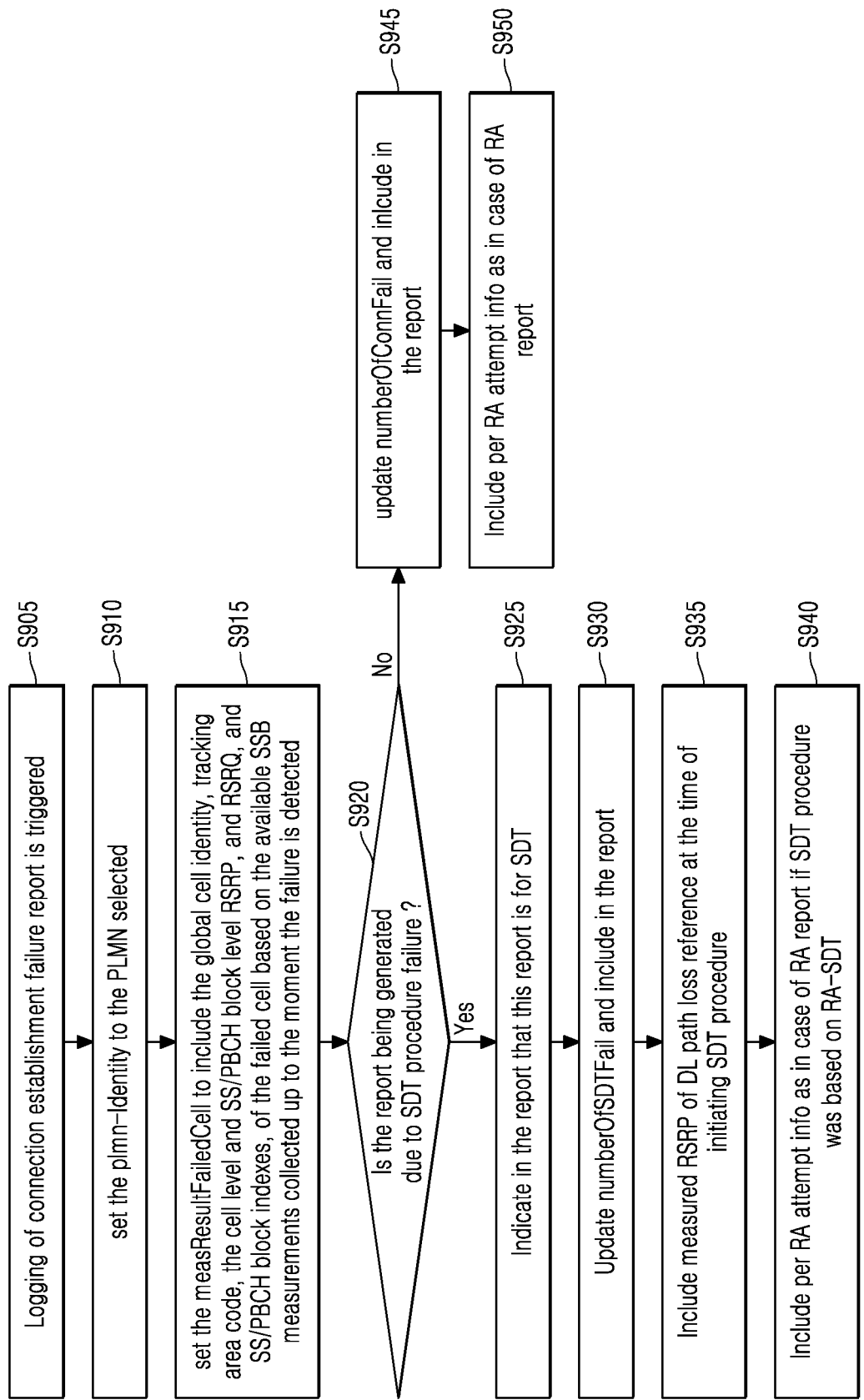
FIG. 9 illustrates a flow chart of the UE operation of logging connection establishment failure report according to an embodiment of the disclosure.

FIG. 9 illustrates a flow chart of the UE operation of logging connection establishment failure report according to an embodiment of the disclosure.

The logging connection establishment failure report is triggered (S905).
  In the report, the UE:
    sets the plmn-Identity to the PLMN selected by upper layers (i.e., NAS) from the PLMN(s) included in the plmn-IdentityList in SIB1 (S910)
    sets the measResultFailedCell to include the global cell identity, tracking area code, the cell level and SS/PBCH block level RSRP, and RSRQ, and SS/PBCH block indexes, of the failed cell based on the available SSB measurements collected up to the moment the UE detected SDT procedure failure (S915)

The UE determines whether the report being generated due to the SDT procedure failure (S920).

if the report being generated due to SDT procedure failure:

Indicate in the report that this report is for SDT (S925). The UE may indicate this if the connection failure report is generated.

Increment numberOfSDTFail and include in the report (S930). Alternately, update numberOfConnFail and include in the report.

Include measured RSRP of DL path loss reference at the time of initiating SDT procedure (S935)

Include per RA attempt info (as described in method 1) if random access procedure was initiated for the SDT (S940)

else update numberOfConnFail (i.e., increment by 1) and include in the report (S945)

Include per RA attempt info (as described in method 2 for the case random access procedure was not initiated for the SDT (S950)

Figure 10:
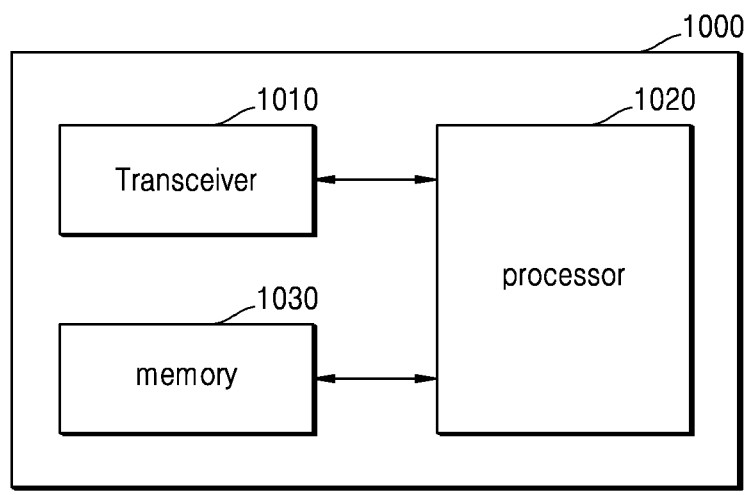
FIG. 10 illustrates a diagram of a UE according to an embodiment of the present disclosure; and, FIG. 11 illustrates a diagram of a base station according to an embodiment of the present disclosure.

Later, when the UE enter the RRC connected state, the UE forwards the logged connection establishment failure report to the gNB when requested by the gNB. When the UE sends the connection establishment failure report to the gNB in UEInformationResponse message:

if connection establishment failure report includes at least one report for SDT procedure failure UE indicate timeSinceSDTFailure in the report if connection establishment failure report includes at least one report for connection establishment/resume failure UE indicate timeSinceConnectionFailure in the report FIG. 10 illustrates a diagram of a UE 1000 according to an embodiment of the present disclosure.

Referring to the FIG. 10, the UE 1000 may include a processor 1010, a transceiver 1020 and a memory 1030. However, all of the illustrated components are not essential. The UE 1000 may be implemented by more or less components than those illustrated in the FIG. 10. In addition, the processor 1010 and the transceiver 1020 and the memory 1030 may be implemented as a single chip according to another embodiment.

The aforementioned components will now be described in detail.

The processor 1010 may include one or more processors or other processing devices that control the proposed function, process, and/or method. Operations of the UE of FIG. 1 to FIG. 11 may be implemented by the processor 1010.

The transceiver 1020 may be connected to the processor 1010 and transmit and/or receive a signal. In addition, the transceiver 1020 may receive the signal through a wireless channel and output the signal to the processor 1010. The transceiver 1020 may transmit the signal output from the processor 1010 through the wireless channel.

The memory 1030 may store the control information or the data included in a signal obtained by the UE 1000. The memory 1030 may be connected to the processor 1010 and store at least one instruction or a protocol or a parameter for the proposed function, process, and/or method. The memory 1030 may include read-only memory (ROM) and/or random access memory (RAM) and/or hard disk and/or CD-ROM and/or DVD and/or other storage devices.

Figure 11:
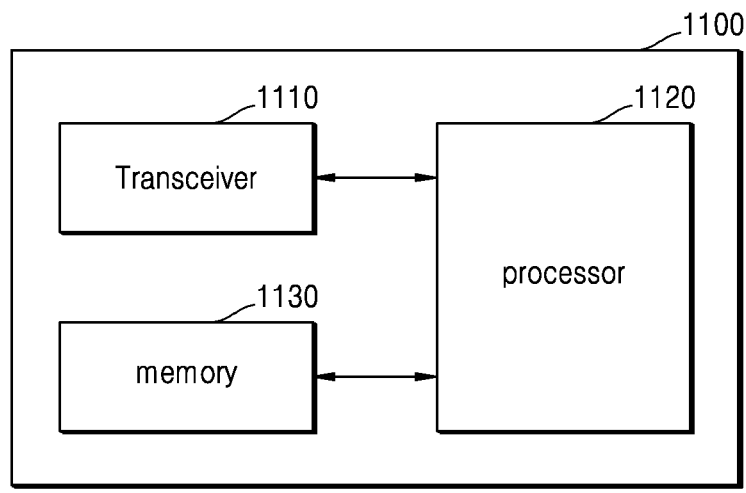

FIG. 11 illustrates a diagram of a base station 1100 according to an embodiment of the present disclosure.

Referring to the FIG. 11, the base station 1100 may include a processor 1110, a transceiver 1111 and a memory 1130. However, all of the illustrated components are not essential. The base station 1100 may be implemented by more or less components than those illustrated in FIG. 11. In addition, the processor 1110 and the transceiver 1111 and the memory 1130 may be implemented as a single chip according to another embodiment.

The aforementioned components will now be described in detail.

The processor 1110 may include one or more processors or other processing devices that control the proposed function, process, and/or method. Operations of the base station (e.g., gNB) of FIG. 1 to FIG. 11 may be implemented by the processor 1110.

The transceiver 1111 may be connected to the processor 1110 and transmit and/or receive a signal. The signal may include control information and data. In addition, the transceiver 1111 may receive the signal through a wireless channel and output the signal to the processor 1110. The transceiver 1111 may transmit a signal output from the processor 1110 through the wireless channel.

The memory 1130 may store the control information or the data included in a signal obtained by the base station 1100. The memory 1130 may be connected to the processor 1110 and store at least one instruction or a protocol or a parameter for the proposed function, process, and/or method. The memory 1130 may include read-only memory (ROM) and/or random access memory (RAM) and/or hard disk and/or CD-ROM and/or DVD and/or other storage devices.

Methods according to the claims of the disclosure or the various embodiments of the disclosure described in the specification may be implemented in hardware, software, or a combination of hardware and software.

When implemented in software, a computer-readable storage medium storing one or more programs (software modules) may be provided. One or more programs stored in the computer-readable storage medium are configured for execution by one or more processors in an electronic device. The one or more programs may include instructions that cause the electronic device to perform the methods in accordance with the claims of the disclosure or the various embodiments of the disclosure described in the specification.

The programs (software modules, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a Local Area Network (LAN), a wide area network (WAN), or a storage area network (SAN), or a combination thereof. The storage device may be connected to an apparatus performing the various embodiments of the disclosure through an external port. In addition, a separate storage device in the communication network may be connected to the apparatus performing the various embodiments of the disclosure.

In the various embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
    initiating a small data transmission (SDT) procedure, in a radio resource control (RRC) inactive state;
    obtaining a report for a log connection failure or an SDT procedure failure, based on an expiry of an SDT timer, wherein the report for the log connection failure includes information indicating that the report is for SDT; and
    in case that the UE enters an RRC connected state, transmitting the report to a base station, based on a request for the report from the base station.

2. The method of claim 1, wherein the report includes information indicating a number of SDT failure, and the number of the SDT failure is increased, based on expiry of the SDT timer.

3. The method of claim 1, wherein the report includes measured reference signal received power (RSRP) of downlink (DL) path loss at a time of initiating the SDT procedure.

4. The method of claim 1, further comprising:
    setting a measurement result in the report to include reference signal received power (RSRP), reference signal receive quality (RSRQ) and Synchronization Signal Physical Broadcast Channel (SS/PBCH) block (SSB) indexes of failed cell based on available SSB measurements collected up to a time at the UE detected SDT procedure failure.

5. The method of claim 1, further comprising performing an integrity check on data of the SDT procedure, while the SDT timer is running,
    wherein the obtaining of the report comprises:
    in case that a failure of the integrity check occurs, obtaining the report for the log connection failure or the SDT procedure failure.

6. The method of claim 1, wherein in case that a random access (RA) procedure is initiated for the SDT procedure and the random access procedure is successfully completed, setting an RA purpose in an RA report to indicate the SDT and setting information of down link reference signal received power (RSRP) above a threshold SDT selection for an RA attempt to indicate whether an RSRP of a Synchronization Signal/Physical Broadcast Channel (SS/PBCH) block corresponding to a random access attempt is above a threshold configured for the SDT.

7. The method of claim 6, wherein the RA report includes measured RSRP of downlink pathloss at a time of initiating the SDT procedure.

8. The method of claim 6, wherein the RA report includes information to indicate whether a first preamble group or a second preamble group is used on the RA procedure.

9. A user equipment (UE) in a wireless communication system, the UE comprising:
    a transceiver; and
    a processor coupled with the transceiver and configured to:
        initiate a small data transmission (SDT) procedure, in a radio resource control (RRC) inactive state,
        obtain a report for a log connection failure or an SDT procedure failure, based on an expiry of an SDT timer, wherein the report for the log connection failure includes information indicating that the report is for SDT, and
        in case that the UE enters an RRC connected state, transmit the report to a base station, based on a request for the report from the base station.

10. The UE of claim 9, wherein the report includes information indicating a number of SDT failure, and the number of the SDT failure is increased, based on expiry of the SDT timer.

11. The UE of claim 9, wherein the report includes measured reference signal received power (RSRP) of downlink (DL) path loss at a time of initiating the SDT procedure.

12. The UE of claim 9, wherein the processor is further configured to:
    set a measurement result in the report to include reference signal received power (RSRP), reference signal receive quality (RSRQ) and Synchronization Signal/Physical Broadcast Channel (SS/PBCH) block (SSB) indexes of failed cell based on available SSB measurements collected up to a time at the UE detected SDT procedure failure.

13. The UE of claim 9, wherein the processor is further configured to:
    perform an integrity check on data of the SDT procedure, while the SDT timer is running, and
    in case that a failure of the integrity check occurs, obtain the report for the log connection failure or the SDT procedure failure.

14. The UE of claim 9, wherein the processor is further configured to:
    in case that a random access (RA) procedure is initiated for the SDT procedure and the random access procedure is successfully completed, set an RA purpose in an RA report to indicate the SDT and set information of down link reference signal received power (RSRP) above a threshold SDT selection for an RA attempt to indicate whether an RSRP of a Synchronization Signal/Physical Broadcast Channel (SS/PBCH) block corresponding to a random access attempt is above a threshold configured for the SDT.

15. The UE of claim 9, wherein the RA report includes measured RSRP of downlink pathloss at a time of initiating the SDT procedure.

16. The UE of claim 9, wherein the RA report includes information to indicate whether a first preamble group or a second preamble group is used on the RA procedure.

* * * * *